(12) United States Patent
Nakamura et al.

(10) Patent No.: US 6,494,545 B2
(45) Date of Patent: Dec. 17, 2002

(54) APPARATUS FOR DIAGNOSING ACCUMULATOR BASED ON FLUID PRESSURE IN ITS FLUID-TIGHTLY SEALED STATE

(75) Inventors: Eiji Nakamura, Aichi-ken (JP); Hiroshi Mizukami, Yokohama (JP)

(73) Assignees: Toyota Jidosha Kabushiki Kaisha, Toyota (JP); NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/933,724

(22) Filed: Aug. 22, 2001

(65) Prior Publication Data

US 2002/0035832 A1 Mar. 28, 2002

(30) Foreign Application Priority Data

Sep. 25, 2000 (JP) .......................................... 2000-290644

(51) Int. Cl.$^7$ ............................ B60T 17/04; B60T 17/08
(52) U.S. Cl. .................. 303/87; 303/DIG. 11; 303/DIG. 3; 303/122.13; 60/413; 138/30
(58) Field of Search ................... 303/DIG. 10, DIG. 11, 303/DIG. 3, DIG. 2, 87, 122, 122.09, 122.12, 122.13, 115.4, 116.1, 116.4; 239/88; 60/413; 138/30, 26, 31; 220/721

(56) References Cited

U.S. PATENT DOCUMENTS

| | | | | |
|---|---|---|---|---|
| 5,152,586 A | * | 10/1992 | Burgdorf | 303/10 |
| 5,685,697 A | * | 11/1997 | Buchanan et al. | 137/554 |
| 5,806,939 A | * | 9/1998 | Feigel et al. | 303/113.5 |
| 6,076,558 A | * | 6/2000 | Mohr et al. | 138/26 |
| 6,132,010 A | * | 10/2000 | Holt et al. | 303/11 |
| 6,158,825 A | * | 12/2000 | Schunck et al. | 303/11 |
| 6,234,148 B1 | * | 5/2001 | Hartke et al. | 123/198 D |
| 6,286,552 B1 | * | 9/2001 | Shimbori et al. | 138/30 |
| 6,312,064 B1 | * | 11/2001 | Koike et al. | 303/116.1 |

FOREIGN PATENT DOCUMENTS

| | | |
|---|---|---|
| JP | 3-266756 | 11/1991 |
| JP | 9-123893 | 5/1997 |
| JP | 10-19001 | 1/1998 |
| JP | B2 2817450 | 8/1998 |
| JP | 11-34860 | 2/1999 |
| JP | B2 2915504 | 4/1999 |
| JP | 2000-249101 | 9/2000 |
| JP | 2000-320501 | 11/2000 |

* cited by examiner

Primary Examiner—Douglas C. Butler
Assistant Examiner—Devon Kramer
(74) Attorney, Agent, or Firm—Oliff & Berridge, PLC

(57) ABSTRACT

A diagnosing apparatus for diagnosing an accumulator operable to store under pressure a pressurized fluid delivered from a high-pressure source and to supply the pressurized fluid to a fluid-operated actuator for operating the fluid-operated actuator, the apparatus including a pressure detecting device for detecting a pressure of the pressurized fluid in the accumulator while the accumulator is placed in a fluid-tightly sealed state in which the accumulator is isolated from both the high-pressure source and the fluid-operated actuator, and a diagnosing device operable to diagnose the accumulator on the basis of the pressure of the pressurized fluid detected by the pressure detecting device in the fluid-tightly sealed state of the accumulator.

20 Claims, 11 Drawing Sheets

_US 6,494,545 B2_

APPARATUS FOR DIAGNOSING ACCUMULATOR BASED ON FLUID PRESSURE IN ITS FLUID-TIGHTLY SEALED STATE

This application is based on Japanese Patent Application No. 2000-290644 filed on Sep. 25, 2000, the contents of which are incorporated hereinto by reference.

BACKGROUND OF THE INVENTION

1. Field of the Invention

The present invention relates to an accumulator and an apparatus for diagnosing the accumulator.

2. Discussion of Related Art

JP-A-9-123893 discloses an example of an apparatus for diagnosing an accumulator. The accumulator diagnosing apparatus disclosed in this publication includes (a) a high-pressure source arranged to deliver a pressurized working fluid; (b) a fluid-operated actuator operable with the pressurized fluid, (c) an accumulator disposed between the high-pressure source and the fluid-operated actuator and cooperating with the high-pressure source and the fluid-operated actuator to constitute a hydraulic system, (d) an accumulator-pressure detecting device operable to detect the pressure of the fluid in the accumulator, and (e) a diagnosing portion operable to determine that the hydraulic system is defective, if the fluid pressure detected by the accumulator-pressure detecting device is held lower than a predetermined lower limit for more than a predetermined length of time.

Although the known accumulator diagnosing apparatus is capable of detecting an abnormal state of the fluid pressure in the hydraulic system, as described above, this apparatus suffers from a problem that it is not capable of diagnosing the accumulator per se.

SUMMARY OF THE INVENTION

It is therefore an object of the present invention to provide an accumulator diagnosing apparatus capable of diagnosing an accumulator per se. It is a second object of the invention to provide an apparatus including the accumulator diagnosing apparatus and capable of controlling a high-pressure source connected to the accumulator. It is a third object of the invention to provide the accumulator that can be diagnosed by the accumulator diagnosing apparatus. One of the above objects may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A diagnosing apparatus for diagnosing an accumulator operable to store under pressure a pressurized fluid delivered from a high-pressure source and supply the pressurized fluid to a fluid-operated actuator for operating the fluid-operated actuator with the pressurized fluid, the apparatus comprising:

a pressure detecting device operable to detect a pressure of the pressurized fluid in the accumulator while the accumulator is placed in a fluid-tightly sealed state in which the accumulator is isolated from both the high-pressure source and the fluid-operated actuator; and a diagnosing device operable to diagnose the accumulator on the basis of the pressure of the pressurized fluid detected by the pressure detecting device in the fluid-tightly sealed state of the accumulator.

The accumulator diagnosing apparatus constructed according to the above mode (1) of this invention is arranged to diagnose the accumulator for any abnormality or defect on the basis of the pressure of the fluid in the accumulator detected while the accumulator is isolated from both the high-pressure source and the fluid-operated actuator. The pressure detecting device is operable to detect the pressure of the pressurized fluid in the accumulator while the accumulator is placed in its fluid-tightly sealed state, so that the diagnosing device is capable of diagnosing the accumulator in the fluid-tightly sealed state of the accumulator.

For instance, the diagnosing apparatus is arranged such that when the fluid pressure detected by the pressure detecting device in the fluid-tightly sealed state of the accumulator is reduced below a predetermined threshold, the diagnosing device diagnoses the accumulator per se or its connector to be defective in its fluid tightness, or diagnoses a cut-off device connected to the accumulator, to be defective in its cut-off function. The cut-off device is operable to isolate the accumulator from the high-pressure source and the fluid-operated actuator.

(2) A diagnosing apparatus according to the above mode (1), wherein the accumulator includes:

a housing; and a partition member disposed in the housing and cooperating with the housing to define an accumulator chamber (84; 162) on one of opposite sides of the partition member, the accumulator chamber storing the pressurized fluid delivered from the high-pressure source, and wherein the pressure detecting device includes an accumulator-chamber pressure sensor operable to detect the pressure of the pressurized fluid in the accumulator chamber.

The accumulator diagnosing apparatus according to the above mode (2) permits diagnosis of an accumulator of bladder type having the partition member in the form of a rubber bladder, an accumulator of bellow type having the partition member in the form of a metallic bellows, and an accumulator of piston type having the partition member in the form of a piston.

In the accumulator of bladder or bellows type in which the partition member is a bladder or bellows, a gas chamber charged with a pressurized gas is usually formed on the side of the partition member which is remote from the accumulator chamber. In the accumulator of piston type in which the partition member is a piston, the above-indicated gas chamber is formed or a biasing member such as a spring is disposed, on the side of the piston remote from the accumulator chamber. In the accumulator of bladder or bellow type, the gas pressure in the gas chamber is equal to the fluid pressure in the accumulator chamber while the accumulator is normal. Accordingly, the accumulator can be diagnosed on the basis of at least one of the fluid pressure in the accumulator chamber and the gas pressure in the gas chamber. The diagnosing apparatus for diagnosing the accumulator of piston type is preferably arranged to diagnose the accumulator on the basis of the fluid pressure in the accumulator chamber, since it is difficult or cumbersome to detect the biasing force of the biasing member.

(3) A diagnosing apparatus according to the above mode (2), wherein the accumulator includes a cut-off device having a first state in which the accumulator chamber is communicated with at least one of the high-pressure source and the fluid-operated actuator, and a second state in which the accumulator chamber is isolated from both the high-pressure source and the fluid-operated actuator.

In the accumulator diagnosing apparatus according to the above mode (3), the accumulator chamber can be placed in the fluid-tightly sealed state by placing the cut-off device in the second state. The fluid pressure in the accumulator chamber placed in the sealed state is detected to diagnose the accumulator. The provision of the cut-off device makes it possible to prevent the pressurized fluid from being unnecessarily discharged from the accumulator chamber, resulting in significant reduction in the amount of energy consumption by the high-pressure source, for example. The cut-off device may be provided within the housing of the accumulator, or outside the housing. In the former case, the cut-off device may be a sealing portion including a sealing member and a stopper portion of the housing which limits the amount of reduction of the volume of the accumulator chamber and on which the sealing member is fluid-tightly seated. In the latter case, the cut-off device may be disposed at a point of connection of the housing of the accumulator and a fluid passage, or at a location spaced from the housing. An example of the cut-off device disposed outside the housing is an electromagnetic cut-off valve connected to a fluid passage connected to the accumulator chamber.

(4) A diagnosing apparatus according to any one of the above modes (1)–(3), wherein the accumulator includes:

a housing;

a partition member is disposed in the housing and cooperating with the housing to define an accumulator chamber and a gas chamber on respective opposite sides of the partition member, the accumulator chamber storing the pressurized fluid delivered from the high-pressure source, while the gas chamber being fluid-tightly charged with a pressurized gas having a pressure which is substantially equal to the pressure of the pressurized fluid in the accumulator chamber; and a stopper operable to limit an amount of reduction of a volume of the accumulator chamber.

(5) A diagnosing apparatus according to the above mode (4), wherein the pressure detecting device includes:

an accumulator-chamber pressure sensor operable to detect the pressure of the pressurized fluid in the accumulator chamber; and a gas-chamber pressure sensor operable to detect the pressure of the pressurized gas in the gas chamber, and wherein the diagnosing device is operable to diagnose the accumulator on the basis of the pressure of the pressurized fluid detected by the accumulator-chamber pressure sensor and the pressure of the pressurized gas detected by the gas-chamber pressure sensor.

In the accumulator diagnosing apparatus according to the above mode (5), the accumulator is diagnosed on the basis of both the fluid pressure in the accumulator chamber and the gas pressure in the gas chamber.

The partition member divides the interior space of the housing into the accumulator chamber and the gas chamber such that the volume of the gas chamber decreases with an increase in the volume of the accumulator chamber. The pressure of the gas chamber increases with a decrease in its volume as the volume of the accumulator chamber increases, and the pressure of the accumulator chamber increases with an increase in the volume of the gas chamber. Accordingly, the fluid pressure in the accumulator chamber and the gas pressure in the gas chamber are kept equal to each other while the accumulator is normal. When the accumulator chamber is defective in its fluid tightness, the volume of the accumulator chamber is reduced to its smallest value determined by the stopper, and the fluid pressure in the accumulator chamber is reduced even after the volume of this accumulator chamber has been reduced to the smallest value, while the gas pressure in the gas chamber is no longer reduced, or is reduced by a smaller amount than the fluid pressure in the accumulator chamber. Accordingly, the fluid pressure in the accumulator chamber becomes lower than the gas pressure in the gas chamber where the accumulator is defective. Thus, the fluid pressure in the accumulator chamber and the gas pressure in the gas chamber are compared with each other when the volume of the accumulator chamber is no longer reduced (or when the volumes of the two chambers are no longer changed) if the accumulator is normal. If the fluid chamber in the accumulator chamber is lower than the gas pressure in the gas chamber in the above-indicated state in which the volume of the accumulator chamber is the smallest, this means that the fluid tightness of the accumulator chamber is defective, that is, the accumulator is defective.

(6) A diagnosing apparatus according to any one of the above modes (1)–(3), wherein the accumulator includes:

a housing; and a partition member disposed in the housing and cooperating with the housing to define an accumulator chamber and a gas chamber on respective opposite sides of the partition member, the accumulator chamber storing the pressurized fluid delivered from the high-pressure source, while the gas chamber being fluid-tightly charged with a pressurized gas having a pressure which is substantially equal to the pressure of the pressurized fluid in the accumulator chamber.

(7) A diagnosing apparatus according to the above mode (6), wherein the pressure detecting device includes:

an accumulator-chamber pressure sensor operable to detect the pressure of the pressurized fluid in the accumulator chamber; and a gas-chamber pressure sensor operable to detect the pressure of the pressurized gas in the gas chamber, and wherein the diagnosing device is operable to diagnose the accumulator on the basis of at least one of the pressure of the pressurized fluid detected by the accumulator-chamber pressure sensor and the pressure of the pressurized gas detected by the gas-chamber pressure sensor.

The accumulator may be diagnosed on the basis of the fluid pressure in the accumulator chamber, and/or the gas pressure in the gas chamber. The accumulator may be diagnosed to be defective, if the detected fluid pressure or gas pressure in the accumulator chamber or gas chamber is lower than a predetermined threshold.

(8) A diagnosing apparatus according to any one of the above modes (1)–(3), wherein the accumulator includes:

a housing;

a partition member disposed in the housing and cooperating with the housing to define an accumulator chamber on one of opposite sides of the partition member, the accumulator chamber storing the pressurized fluid delivered from the high-pressure source; and a sealing portion operable to fluid-tightly seal the accumulator chamber when a volume of the accumulator chamber has decreased to a predetermined value.

(9) A diagnosing apparatus according to the above mode (8), wherein the pressure detecting device includes an accumulator-chamber pressure sensor operable to detect the pressure of the pressurized fluid in the accumulator chamber, and wherein the diagnosing device is operable to diagnose the accumulator on the basis of the pressure of the pressurized fluid detected by the accumulator-chamber pressure sensor when the accumulator chamber is fluid-tightly sealed by the sealing portion.

When the volume of the accumulator chamber has decreased to the predetermined value, the accumulator chamber is fluid-tightly sealed by the sealing portion. In this sealed state of the accumulator chamber, the fluid pressure in the accumulator chamber must be held substantially constant if the accumulator is normal. If the accumulator chamber is defective in its fluid tightness, the fluid pressure in the accumulator chamber is lower than a predetermined value.

Accordingly, the accumulator chamber can be diagnosed to be defective in its fluid tightness if the fluid pressure in the accumulator chamber detected in the sealed state of the accumulator chamber is lower than a predetermined threshold value, or a rate of reduction of that fluid pressure is lower than a predetermined threshold value. These threshold values of the fluid pressure or rate of reduction are determined by an experiment. Alternatively, the threshold value of the fluid pressure may be determined such that the fluid pressure will not be reduced below that threshold value if the accumulator is normal, and the threshold value of the rate of reduction may be determined such that fluid pressure will not be reduced at a rate higher than that threshold value if the accumulator is normal. Further, the threshold values may be determined on the basis of the gas pressure in the gas chamber. Since the fluid pressure in the accumulator chamber and the gas pressure in the gas chamber must be equal to each other while the accumulator is normal, as described above, the accumulator can be diagnosed to be defective if the fluid pressure in the accumulator chamber is lower than the gas pressure by more than a predetermined amount. Therefore, the threshold value of the fluid pressure in the accumulator chamber may be determined to be lower than the gas pressure by a suitable amount. In this case, the accumulator is diagnosed on the basis of both the fluid pressure in the accumulator chamber and the gas pressure in the gas chamber.

The sealing portion may include a stopper which limits the amount of movement of the partition member to limit the amount of reduction of the volume of the accumulator chamber. In this case, the sealing portion preferably includes a sealing member disposed on at least one of the partition member and the stopper, so as to establish a high degree of fluid tightness between the partition member and the stopper. The stopper may be constituted by an inner part of the housing of the accumulator, which inner part partially defines the accumulator chamber. Alternatively, the stopper may be a member separate from the housing.

(10) A diagnosing apparatus according to any one of the above modes (1)–(9), wherein the accumulator has an accumulator chamber for storing the pressurized fluid delivered from the high-pressure source, and includes an electromagnetic cut-off valve device having a fist state in which the accumulator chamber is communicated with at least one of the high-pressure source and the fluid-operated actuator, and a second state in which the accumulator chamber is isolated from both of the high-pressure source and the fluid-operated actuator, and wherein the pressure detecting device includes an accumulator-chamber pressure sensor operable to detect the pressure of the pressurized fluid in the accumulator chamber, the diagnosing device being operable to diagnose the accumulator on the basis of the pressure of the pressurized fluid in the accumulator chamber detected when the electromagnetic cut-off valve device is placed in the second state.

In the accumulator diagnosing apparatus according to the above mode (10), the accumulator is diagnosed on the basis of the fluid pressure in the accumulator chamber detected when the electromagnetic cut-off valve device is placed in the second state in which the accumulator chamber is isolated from both of the high-pressure source and the fluid-operated actuator. The present diagnosing apparatus is advantageous in that the accumulator chamber can be fluid-tightly sealed by controlling the cut-off valve device, independently of the volume of the accumulator chamber.

(11) A diagnosing apparatus according to the above mode (11), wherein the diagnosing device includes a switching portion operable to switch the electromagnetic cut-off valve device from the first state to the second state when the pressure of the pressurized fluid in the accumulator chamber detected by the accumulator-chamber pressure sensor has a predetermined value, the diagnosing device being operable to diagnose the accumulator on the basis of a change in the pressure of the pressurized fluid in the accumulator chamber detected by the accumulator-chamber pressure sensor after the cut-off valve device is switched to the second state.

While the accumulator is normal, the detected pressure of the fluid in the accumulator chamber is held substantially constant at the predetermined value or only slightly changes from the predetermined value. While the cut-off valve device is defective, the detected fluid pressure changes from the predetermined value to a considerable extent.

The accumulator or cut-off valve device is diagnosed to be defective, if the amount and/or rate of change of the fluid pressured detected by the accumulator-chamber pressure sensor is/are larger or higher than a predetermined value or values, for instance, if the rate of reduction of the detected fluid pressure is higher than a predetermined upper limit, if the amount of reduction of the detected fluid pressure a predetermined time after the cut-off valve device is switched to the second state is larger than a predetermined upper limit.

(12) A diagnosing apparatus according to any one of the above modes (1)–(11), wherein the diagnosing device is operable to diagnose the accumulator in at least one of a first condition in which the high-pressure source is not placed in a substantially operated state and a second condition in which a supply of the pressurized fluid from the accumulator to the fluid-operated actuator is not necessary.

In the accumulator diagnosing apparatus according to the above mode (12), the accumulator is diagnosed on the basis of the fluid pressure in the accumulator when the accumulator is placed in the fluid-tightly sealed state. Where the accumulator is diagnosed for a fluid leakage therefrom, the diagnosis of the accumulator is preferably effected while the high-pressure source is not placed in the substantially operated state. While the high-pressure source is in operation, it is difficult to accurately diagnose the accumulator for a fluid leakage therefrom. The first condition in which the high-pressure source is not placed in the substantially operated state is interpreted to include an operating state of the high-pressure source in which the output pressure of the high-pressure source does not have an influence on the fluid pressure in the accumulator. For instance, the first state includes an operating state of the high-pressure source in which the output pressure of the high-pressure source is considerably lower than the fluid pressure in the accumulator. The high-pressure source is considered to be in the first state, immediately after the high-pressure source has been switched from the off state to the on state. Namely, the high-pressure source is not placed in the substantially operated state in a very initial portion of an operation of the high-pressure source in which a substantially pressurized fluid is not delivered from the high-pressure source.

The accumulator is desirably diagnosed while the accumulator is isolated from the fluid-operated actuator, that is, while the pressurized fluid is not delivered from the accumulator to the fluid-operated actuator. In this respect, the accumulator is preferably diagnosed in the second state in which the supply of the pressurized fluid from the accumulator to the fluid-operated actuator is not necessary.

In the accumulator diagnosing apparatus according to the above mode (5) or (9), the accumulator is diagnosed while the accumulator chamber has the smallest volume. For instance, the accumulator chamber has the smallest volume when a relatively long time has passed after the high-pressure source is turned off. That is, the volume of the accumulator chamber may be reduced to the smallest value due to leakage of the pressurized fluid at a relatively low rate while the high-pressure source is held in the off state for a relatively long time. The accumulator may be diagnosed after the volume of the accumulator chamber is reduced to the smallest value by positively consuming the pressurized fluid, for example, by discharging the pressurized fluid from the accumulator to the fluid-operated actuator or a suitable low-pressure source while the accumulator is isolated from the high-pressure source. This consumption of the pressurized fluid is desirably achieved when it is not necessary to supply the fluid-operated actuator with the pressurized fluid.

The accumulator may be diagnosed when it is not considered necessary to supply the fluid-operated actuator with the pressurized fluid.

(13) A diagnosing apparatus according to any one of the above modes (1)–(12), wherein the high-pressure source comprises a pump device including (a) an electric motor, and (b) a pump driven by the electric motor, to deliver a pressurized fluid, the high-pressure source being included in a braking system for an automotive vehicle.

In the accumulator diagnosing apparatus according to the above mode (13), the accumulator may be diagnosed after the electric motor of the pump device has been held in the off state for more than a predetermined time, when the electric motor is switched from the off state to the on state, or when a main switch for turning on the high-pressure source or a main switch (e.g., an ignition switch) provided on the automotive vehicle is switched from the off state to the on state.

(14) A diagnosing apparatus according to any one of the above modes (1)–(13), wherein the fluid-operated actuator includes a wheel brake cylinder of a wheel brake for braking a wheel of a vehicle, the wheel brake including a rotor rotating with the wheel and a friction member which is forced onto the rotor by the wheel brake cylinder to brake the wheel.

The wheel brake described above is operated with its wheel brake cylinder being activated with the pressurized fluid delivered from the accumulator. While the need to operate the wheel brake is relatively low, the wheel brake cylinder may be isolated from the accumulator. This need is relatively low while the vehicle is stationary, when a parking brake of the vehicle is in the operated state, or when a shift lever of the vehicle is placed in a parking position.

The pump device, the wheel brake including the wheel brake cylinder, and the accumulator may be considered to constitute a braking system.

(15) A diagnosing apparatus according to any one of the above modes (1)–(14), wherein an output of the pressure detecting device is used to control the high-pressure source.

For instance, the high-pressure source is controlled on the basis of the fluid pressure in the accumulator detected by the pressure detecting device, such that the detected fluid pressure is held within a predetermined range. Thus, the output of the pressure detecting device is used not only for diagnosing the accumulator but also for controlling the high-pressure source.

(16) A diagnosing apparatus according to any one of the above modes (1)–(15), wherein an output of the pressure detecting device is used to control a pressure control device disposed between the fluid-operated actuator and the accumulator.

The pressure control device is controlled on the basis of the fluid pressure in the accumulator detected by the pressure detecting device, to control the pressure of the pressurized fluid to be supplied to the fluid-operated actuator.

(17) An apparatus including the diagnosing apparatus according to any one of the above modes (1)–)16) and operable to control said high-pressure source in different manners when the diagnosing apparatus determines that said accumulator are normal and defective, respectively.

For instance, the high-pressure source is held in the off state without an electric energy applied thereto when the accumulator is diagnosed to be defective. Where the high-pressure source is controlled when the accumulator is diagnosed to be normal such that the fluid pressure in the accumulator is held within a predetermined normal range, the high-pressure source may be controlled when the accumulator is diagnosed to be defective such that the fluid pressure in the accumulator is held in a comparatively narrow range whose upper limit is lower than that of the normal range. In the latter case, a load acting on the partition member provided in the accumulator can be reduced.

The pressure control device described above with respect to the above mode (16) may be controlled in different manners when the diagnosing apparatus determines that the accumulator is normal and defective, respectively. For instance, the pressure control device is controlled to inhibit flows of the pressurized fluid between the accumulator and the fluid-operated actuator, when the accumulator is diagnosed to be defective.

(18) A combination of an accumulator and a diagnosing apparatus for diagnosing the accumulator, the accumulator comprising:

a housing;

a bellows disposed in the housing and cooperating with the housing to define an accumulator chamber and a gas chamber on respective opposite sides of the partition member, the accumulator chamber storing a pressurized fluid while the gas chamber being fluid-tightly charged with a pressurized gas having a pressure which is substantially equal to a pressure of the pressurized fluid in the accumulator chamber;

an accumulator-chamber pressure sensor operable to detect the pressure of the pressurized fluid in the accumulator chamber; and a sealing device operable to fluid-tightly seal the accumulator chamber when a volume of the accumulator chamber has decreased to a predetermined value, and wherein the diagnosing apparatus comprises a diagnosing device operable to diagnose the accumulator on the basis of the pressure of the pressurized fluid detected by the accumulator-chamber pressure sensor when the accumulator chamber is fluid-tightly sealed by the sealing device.

In the combination according to the above mode (18), the diagnosing device of the diagnosing apparatus is capable of diagnosing the sealing device for a sealing failure or defect thereof. While the sealing device is normal in its sealing function, the fluid pressure in the accumulator chamber and the gas pressure in the gas chamber are equal to each other, so that the load acting on the bellows is relatively small. When the sealing device is defective, the fluid pressure in the accumulator chamber is made lower than the gas pressure in the gas chamber, so that a relatively large load acts on the bellows due to a considerable difference between the fluid pressure and the gas pressure, giving rise to a risk of damaging the bellows. According to the present mode of the invention, the sealing failure or defect of the sealing device can be detected with high reliability, making it possible to prevent damaging of the bellows.

The combination of the accumulator and the diagnosing apparatus according to the above mode (18) may incorporate the technical feature according to any one of the above modes (1)–(13). For instance, the sealing device may be the sealing portion according to the above mode (8) or the electromagnetic cut-off valve device according to the above mode (10).

(19) An accumulator comprising:

a housing;

a bellows disposed in the housing and cooperating with the housing to define an accumulator chamber and a gas chamber on respective opposite sides of the partition member, the accumulator chamber storing a pressurized fluid while the gas chamber being fluid-tightly charged with a pressurized gas having a pressure which is substantially equal to a pressure of the pressurized fluid in the accumulator chamber; and an accumulator-chamber pressure sensor operable to detect the pressure of the pressurized fluid in the accumulator chamber.

In the accumulator according to the above mode (19), the fluid pressure in the accumulator chamber is directly detected by the accumulator-chamber pressure sensor, so that the accumulator can be accurately diagnosed on the basis of the detected fluid pressure in the accumulator chamber. The detected fluid pressure in the accumulator chamber accurately represents the pressure of the pressurized fluid stored in the accumulator.

The accumulator according to the above mode (19) may incorporate the technical feature according to any one of the above modes (1)–(14). For instance, the accumulator may incorporate the sealing portion according to the above mode (8) or the electromagnetic cut-off valve device according to the above mode (19). Further, the present accumulator may incorporate both the sealing portion and the electromagnetic cut-off valve device. In this case, the fluid leakage from the accumulator chamber can be prevented with high stability. The accumulator-chamber pressure sensor may be arranged to directly detect the fluid pressure in the accumulator chamber when the accumulator chamber is fluid-tightly sealed by such a sealing device.

(20) An accumulator according to the above mode (19), wherein the accumulator-chamber pressure sensor is attached to the housing. For instance, the accumulator-chamber pressure sensor may be substantially incorporated within a body of the housing.

Where the accumulator-pressure sensor is attached to the housing of the accumulator, this sensor need not be connected to a fluid passage connected to the accumulator chamber. Further, the present accumulator-pressure sensor does not require an exclusive connector and accordingly permits higher accuracy of detection of the fluid pressure in the accumulator chamber. For instance, the accumulator-chamber pressure sensor is fitted in a hole formed through the housing such that the hole communicates with the accumulator chamber. The pressure sensor may be screwed in a tapped hole formed in the housing in communication with the accumulator chamber. Where a gas-chamber pressure sensor is provided, this sensor may also be attached to the housing of the accumulator.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Referring to first to FIGS. 1–7, there will be described a hydraulically operated braking system for an automotive vehicle, which system includes an accumulator constructed according to a first embodiment of this invention, and an accumulator diagnosing apparatus which is also constructed according to the first embodiment, to diagnose the accumulator.

Figure 2:
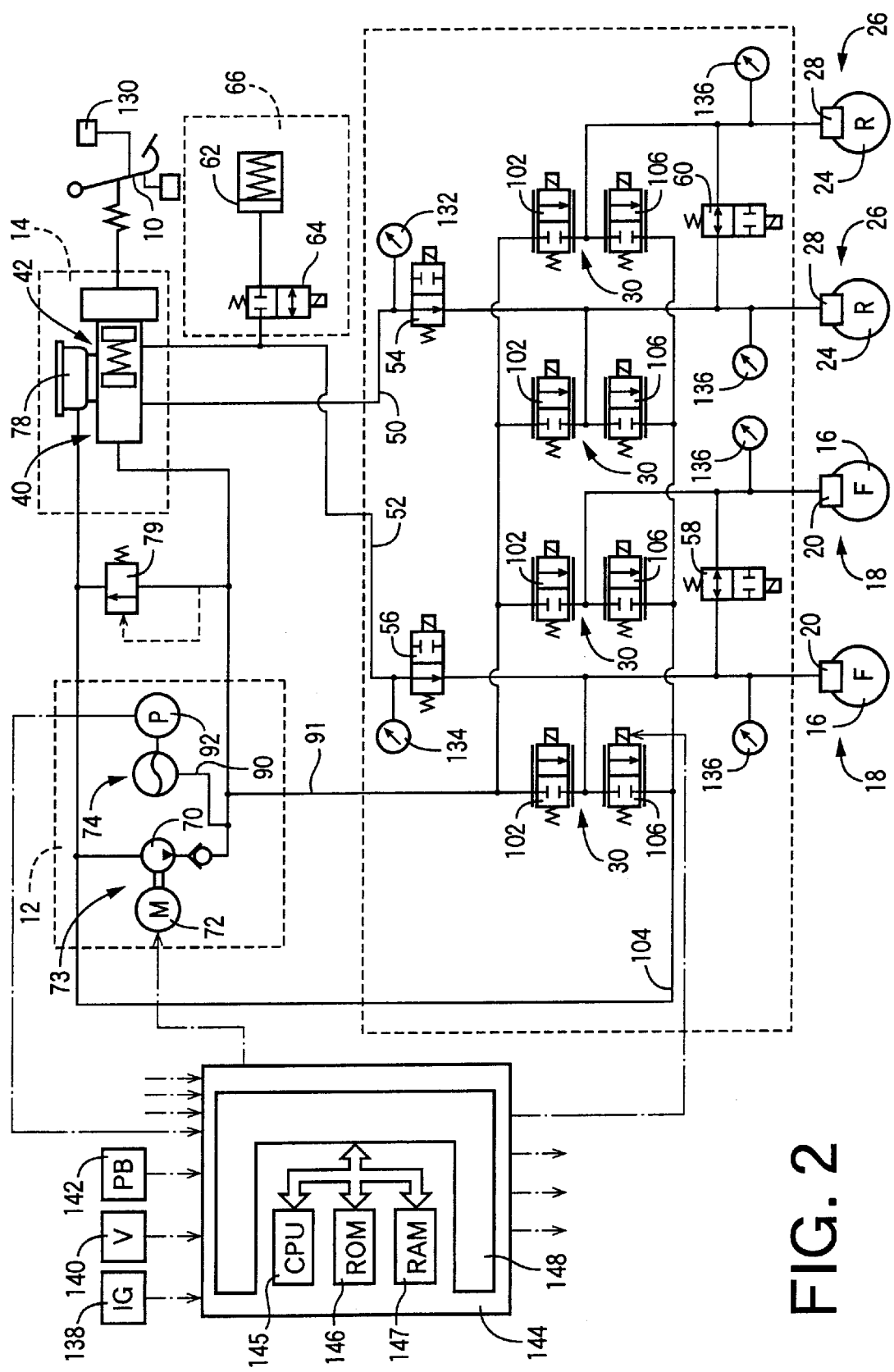
FIG. 2 is a diagrammatic view of a braking system including the accumulator diagnosing apparatus of FIGS. 1A and 1B.

As shown in FIG. 2, the braking system includes a manually operable brake operating member in the form of a brake pedal 10, a power-operated hydraulic pressure source 12, a hydro-booster master cylinder unit 14, two front wheel brakes 18 including respective brake cylinders 20 to brake respective front wheels 16, two rear wheel brakes 26 including respective brake cylinders 28 to brake respective rear wheels 24, and four linear valve devices 30 provided for the respective four brake cylinders 20, 28. Each of the brakes 18, 26 includes a rotor rotating with the corresponding wheel 16, 24, and a friction member which is forced onto the rotor by the corresponding wheel brake cylinder 20, 28.

The hydro-booster master cylinder unit 14 provided with the hydraulic booster includes a hydraulic booster 40 and a master cylinder 42.

The power-operated hydraulic pressure source 12 is connected to the hydraulic booster 40, which controls the pressure of a pressurized incompressible fluid (liquid) delivered from the hydraulic pressure source 12, to a value corresponding to an operating force acting on the brake pedal 10. The master cylinder 42 includes a pressurizing piston operatively connected to the brake pedal 10. The pressurizing piston partially defines a pressurizing chamber on its front side. When the brake pedal 10 is operated, the hydro-booster master cylinder unit 14 is operated such that the fluid pressure in the pressurizing chamber is pressurized by an advancing movement of the pressurizing piston, to a value corresponding to the operating force of the brake pedal 10 as boosted by the hydraulic booster 40.

The hydraulic booster 40 is connected through a fluid passage 50 to the brake cylinders 28 for the rear wheels 24, while the master cylinder 42 is connected through a fluid passage 52 to the brake cylinder 20 for the front wheels 16.

The two fluid passages 50, 52 are provided with respective master-cylinder cut-off valves 54, 56. A fluid passage connecting the two front wheel brake cylinders 20 is provided with a communication valve 58, while a fluid passage connecting the two rear wheel brake cylinders 28 is provided with a communication valve 60. A stroke simulator 62 is connected through a simulator shut-off valve 64 to a portion of the fluid passage 52 which is upstream of the master-cylinder cut-off valve 56. The stroke simulator 62 and the simulator shut-off valve 64 constitute a major part of a stroke simulator device 66.

The power-operated hydraulic pressure source 12 includes a high-pressure source in the form of a pump device 73, and an accumulator 74. The pump device 73 includes a pump 70 and a pump motor 72 provided to drive the pump 70. The pump 70 is arranged to pressurize the incompressible fluid received from a reservoir 78 of the hydro-booster master cylinder unit 14. The working fluid pressurized by the pump 70 is stored in the accumulator 74. A pressure relief valve 79 is disposed between the suction and delivery sides (input and output sides, or low-pressure and high-pressure sides) of the pump device 73, in order to prevent an excessive rise of the output or delivery pressure of the pump device 73.

The pump 70 used in the present embodiment is of a plunger type. However, the pump device 73 may use a pump of a gear type.

Figure 1A:
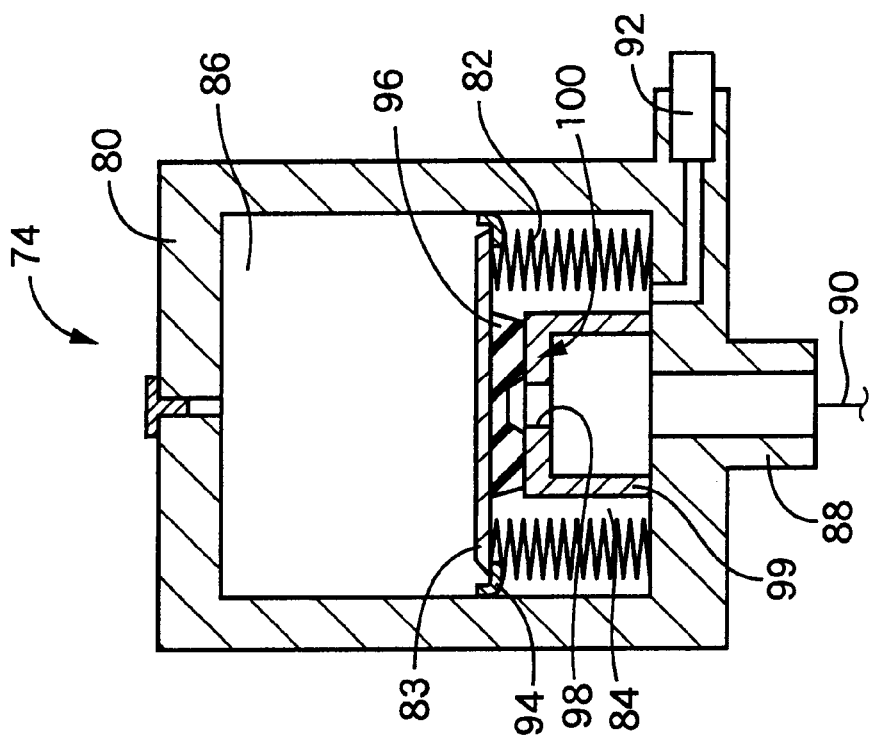
FIGS. 1A and 1B are elevational views in cross section schematically showing an accumulator which is constructed according to a first embodiment of this invention and which is to be diagnosed by an accumulator diagnosing apparatus which is also constructed according to the first embodiment.
Figure 1B:
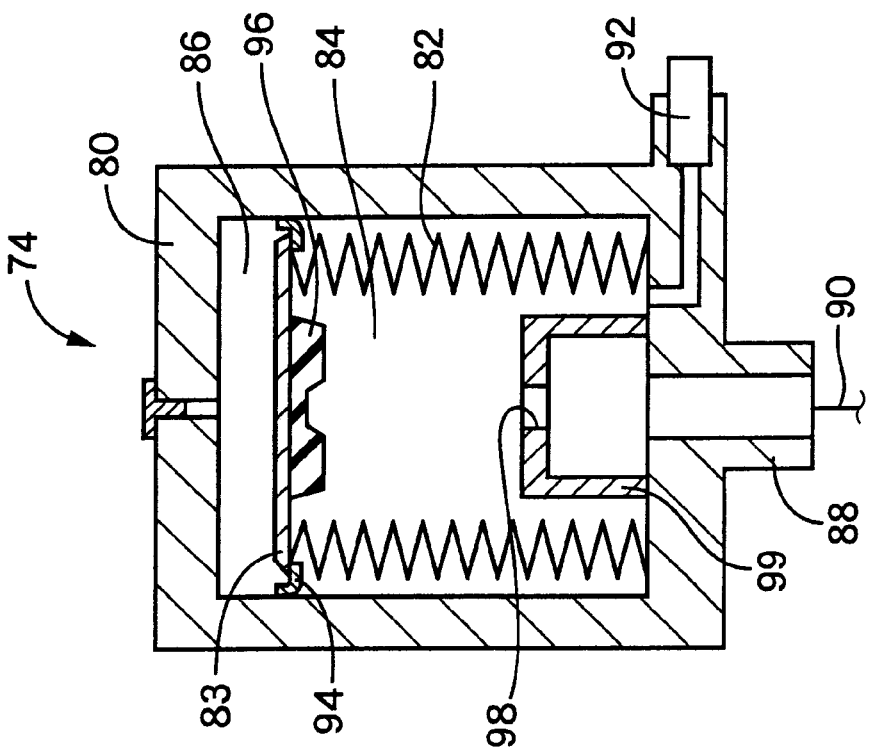

As shown in FIGS. 1A and 1B, the accumulator 74 is of a bellows type, including a housing 80 and a bellows 82 which separates the interior space of the housing 80 into two variable-volume chambers. The bellows 82 is fluid-tightly fixed at its fixed end to the bottom wall of the housing 80 such that the bellows 82 is expansible and contractible within the housing 80. The bellows 82 is provided at the other or free end with an end plate 83. In the present embodiment, the bellows 82 is considered to include the expansible and contractible portion and the end plate 83 and function as a partition member which separates the interior of the housing 80 into the two variable-volume chambers. However, the bellows 82 and the end plate 83 may be considered to cooperate to function as the partition member.

In the present embodiment, one of the two variable-volume chambers which is on the inner side of the bellows 82 is used as an accumulator chamber 84 in which the pressurized fluid delivered from the pump 70 is stored under pressure. The other variable-volume chamber on the outer side of the bellows 82 is used as a gas chamber 86 which is charged with a pressurized gas. The bottom wall of the housing 80 has a connector portion 88 which cooperates with the bellows 82 to define the accumulator chamber 86. The connector portion 88 is connected to a fluid passage 90, which in turn is connected to a fluid passage 91 connecting the pump device 73 to the wheel brake cylinders 20, 28. Thus, the accumulator 74 is connected to the pump device 73 and the wheel brake cylinders 20, 28 through the fluid passages 90, 91.

Figure 3:
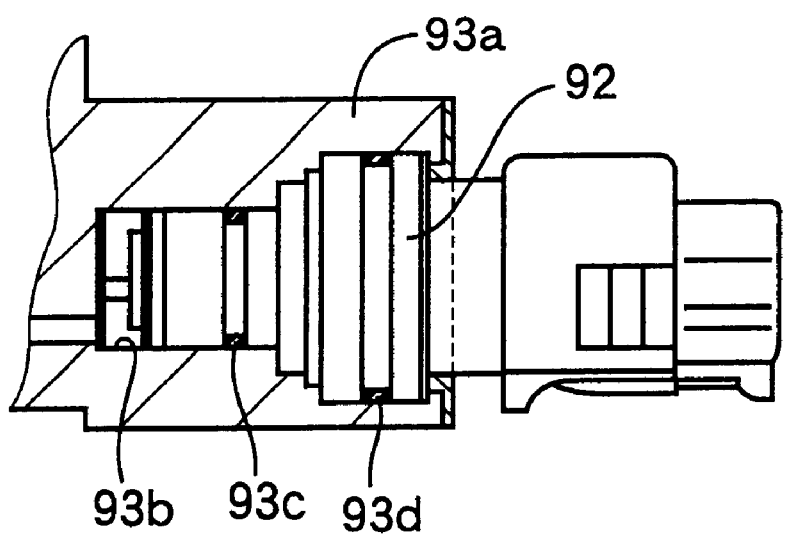
FIG. 3 is a fragmentary view in cross section showing a hosing of the accumulator of FIGS. 1A and 1B.

The body of the housing 80 incorporates a pressure sensor 92 arranged to detect the pressure of the fluid stored in the accumulator chamber 84. The thus detected fluid pressure within the accumulator pressure 84 is considered to be the fluid pressure within the accumulator 74. In the present embodiment, the pressure sensor 92 serves as an accumulator-pressure detecting device operable to detect the fluid pressure in the accumulator 74, and also serves as an accumulator-chamber pressure sensor for detecting the fluid pressure in the accumulator chamber 84. As shown in FIG. 3, the housing 80 includes an extension 93a that has a hole 93b communicating with the accumulator chamber 84. The pressure sensor 92 is fitted in a part of the hole 93b. Reference signs 93c and 93d denote sealing members for maintaining fluid tightness between the pressure sensor 92 and the hole 93b.

The pump motor 72 controlled so that the fluid pressure as detected by the pressure sensor 92 is held within a predetermined optimum range, so that the fluid pressure in the accumulator chamber 84 is maintained within the optimum range.

The bellows 82 is expanded or contracted so as to move the end plate 83 to a position at which the gas pressure in the gas chamber 86 and the fluid pressure in the accumulator pressure 84 are equal to each other. The volume of the gas chamber 86 decreases with an increase in the volume of the accumulator chamber 84, so that the gas pressure in the gas chamber 86 is equalized with the fluid pressure in the accumulator chamber 84.

The end plate 83 of the bellows 82 is provided at its periphery with a guiding member 94, which assures expansion and contraction of the bellows 82 in a direction substantially parallel to its axial direction. The end plate 83 carries a sealing member 96 fixed to its inner flat surface. The sealing member 96 is formed of a rubber material. On the other hand, a stopper 99 is fixed to the inner surface of the connector portion 88 of the housing 80. The stopper 99 has an aperture 98. The smallest volume of the accumulator chamber 84 is defined by abutting contact of the sealing member 96 with the stopper 99. The aperture 98 is fluid-tightly closed by the sealing member 96 while the sealing member 96 is placed in abutting contact with the stopper 99. In other words, the aperture 98 is closed when the accumulator chamber 84 has the smallest volume. It will be understood that the sealing member 96 and the stopper 99 having the aperture 98 cooperate with each other to constitute a closure device in the form of a sealing portion 100, as indicated in FIG. 1B. While this sealing portion 100 is placed in its fluid-tightly closed state, the accumulator chamber 84 is placed in its sealed state, that is, is isolated from both the pump device 73 and the wheel brake cylinders 20, 28 (fluid passage 80). In this sense, the sealing portion 100 may be considered to serve as a cut-off device for isolating the accumulator chamber 84 from the pump device 73 and the wheel brake cylinders 20, 28.

The bellows 82 is formed of a metallic material having a high degree of gas impermeability, so that the gas does not permeate from the gas chamer 86 through the bellows 82 into the accumulator chamber 84.

Each of the linear valve devices 30 includes a pressure-increasing valve in the form of a pressure-increasing linear valve 102 and a pressure-reducing valve in the form of a pressure-reducing linear valve 106. The pressure-increasing linear valve 102 is provided in a portion of the fluid passage 91 between the accumulator 74 and the corresponding wheel brake cylinder 20, 28, while the pressure-reducing linear valve 106 is provided in a fluid passage 104 connecting the wheel brake cylinder 20, 28 and the master reservoir 78.

Figure 4:
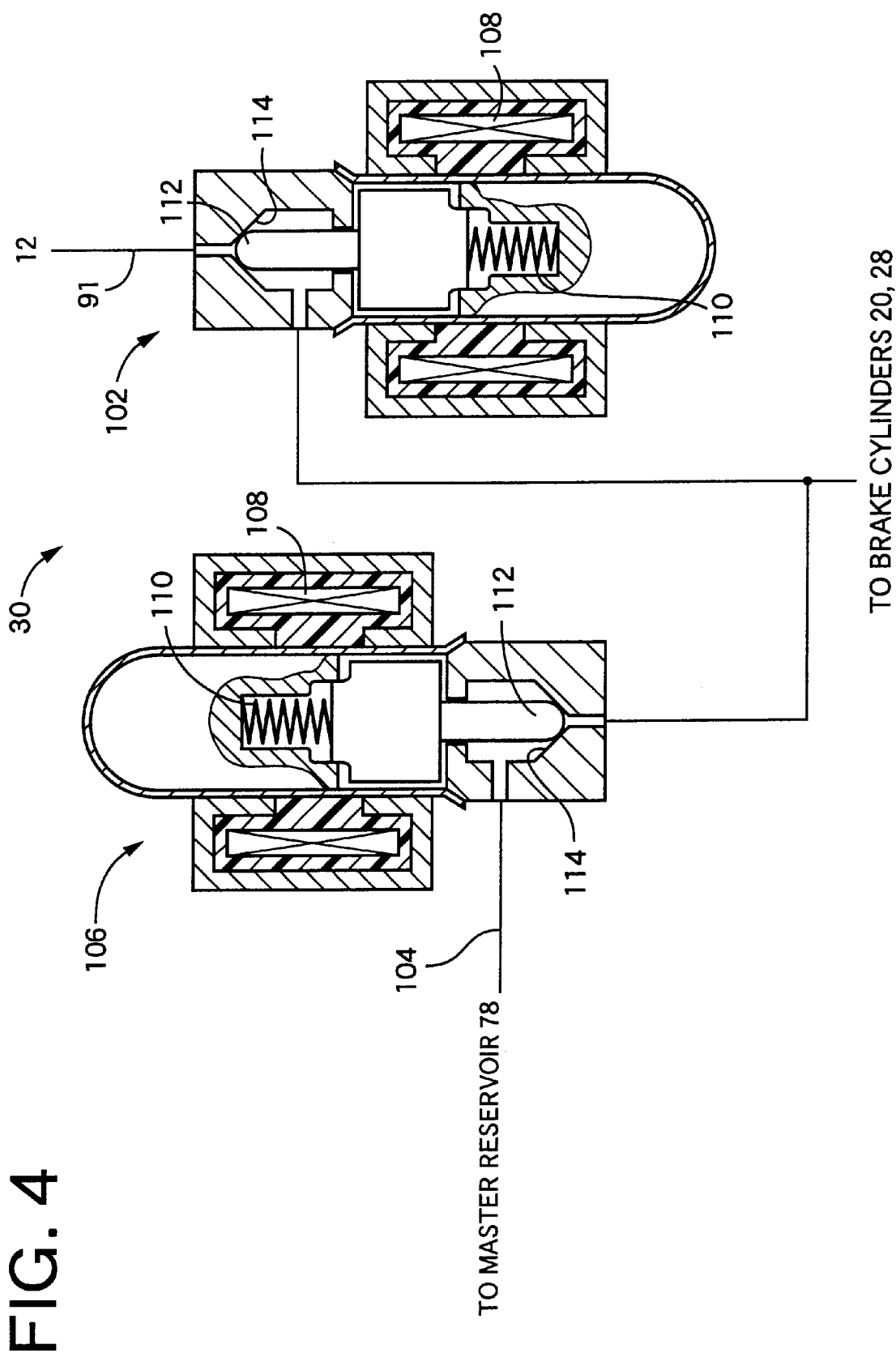
FIG. 4 is an elevational view in cross section schematically showing a linear valve device incorporated in the braking system of FIG. 2.

Each of the pressure-increasing and pressure-reducing linear valves 102, 106 is a normally closed valve, as indicated in FIG. 4. Each linear valve 102, 106 includes a solenoid with a coil 108, a spring 110, and a seating valve including a valve member 112 and a valve seat 114.

While the coil 108 is in its de-energized state with no electric current applied thereto, a biasing force of the spring 110 acts on the valve member 112 in a direction that causes the valve member 112 to be seated on the valve seat 114, while a force based on a fluid pressure difference across the linear valve 102, 106 acts on the valve member 112 in the reverse direction that causes the valve member 112 to be unseated from the valve seat 114. When the force based on the fluid pressure difference is larger than the biasing force of the spring 110, the valve member 112 is kept apart from the valve seat 114.

When the coil 108 is energized with an electric current applied thereto, an electromagnetic force acts on the valve member 112 so as to move the valve member 112 to be moved away from the valve seat 114. In this state, the valve member 112 receives the electromagnetic force, the force based on the fluid pressure difference and the biasing force of the spring 110. The position of the valve member 112 relative to the valve seat 114 is determined by a relationship among those three forces. The generated electromagnetic force increases with an increase in the amount of electric current applied to the coil 108. By controlling the amount of electric current to be applied to the solenoid 108, the relative position of the valve member 112 and the valve seat 114 can be controlled to control the fluid pressure in the corresponding wheel brake cylinder 20, 28.

The force based on the fluid pressure difference across the pressure-increasing linear valve 102 corresponds to a difference between the delivery or output pressure of the power-operated hydraulic pressure source 12 and the fluid pressure in the corresponding brake cylinder 20, 28 (hereinafter referred to simply as "braking pressure", where appropriate). On the other hand, the force based on the fluid pressure difference across the pressure-reducing linear valve 106 corresponds to a difference between the fluid pressure in the master reservoir 78 and the braking pressure. In the present embodiment, the output pressure of the power-operated hydraulic pressure source 12 is the accumulator pressure as detected by the pressure sensor 92, so that the pressure-increasing linear valve 102 is controlled on the basis of the fluid pressure detected by the pressure sensor 92.

The present braking system includes: a stroke sensor 130 for detecting the operating stroke of the brake pedal 10; two master-cylinder pressure sensors 132, 134 for detecting fluid pressures in portions of the respective fluid passages 50, 52 upstream of the master-cylinder cut-off valves 54, 56; and four braking pressure sensors 136 for detecting the braking pressures in the respective wheel brake cylinders 20, 28; an ignition switch 138; a vehicle speed sensor 140; and a parking brake switch 142. Those sensors 130, 132, 134, 136, 140 and switches 138, 142, as well as the accumulator pressure sensor 92, are connected to a braking pressure control device 144, which is principally constituted by a computer.

The braking pressure control device 144 includes a central processing unit (CPU) 145, a read-only memory (ROM) 146, a random-access memory (RAM) 147, and an input-output portion 148. To the input-output portion, there are connected through respective driver circuits the linear valve devices 30, master-cylinder cut-off valves 54, 56, communication valves 58, 60, simulator shut-off valve 64, and pump motor 72.

Figure 5:
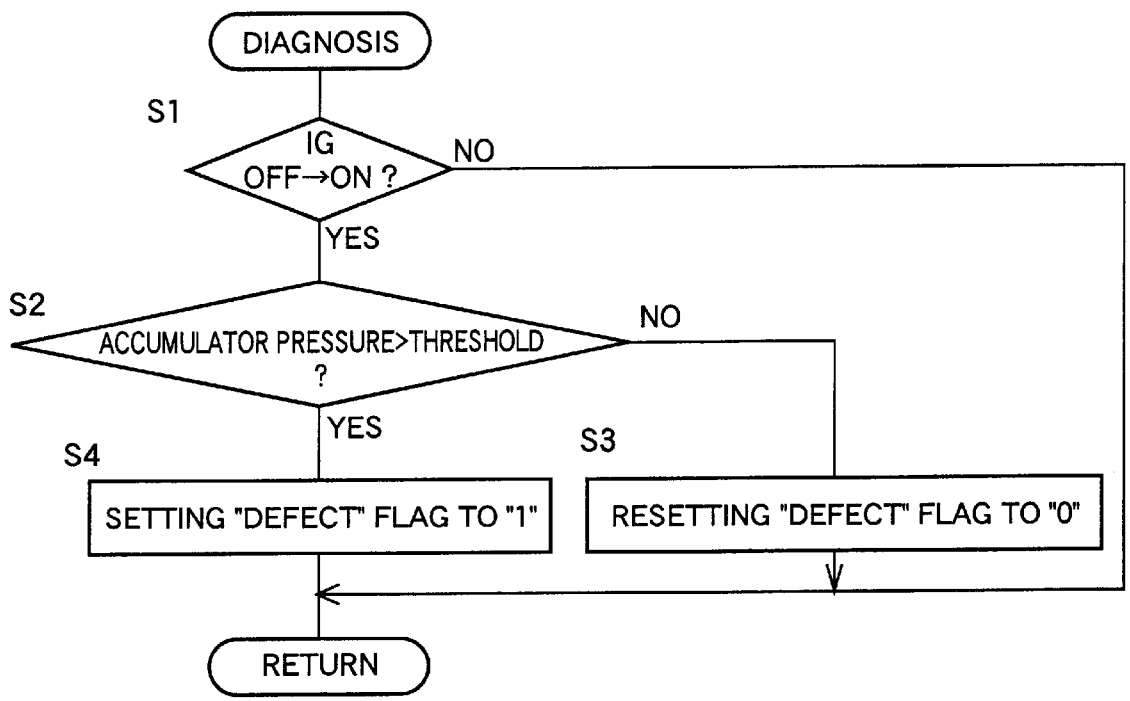
FIG. 5 is a flow chart illustrating an accumulator diagnosing routine executed according to a control program stored in a ROM of a braking pressure control device of the braking system which includes the accumulator diagnosing apparatus.
Figure 6:
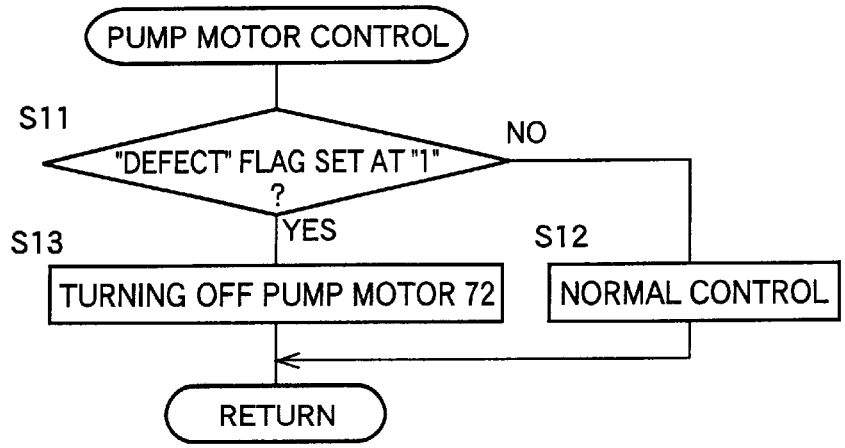
FIG. 6 is a flow chart illustrating a pump motor control routine executed according to a control program stored in the ROM of the braking pressure control device.
Figure 7:
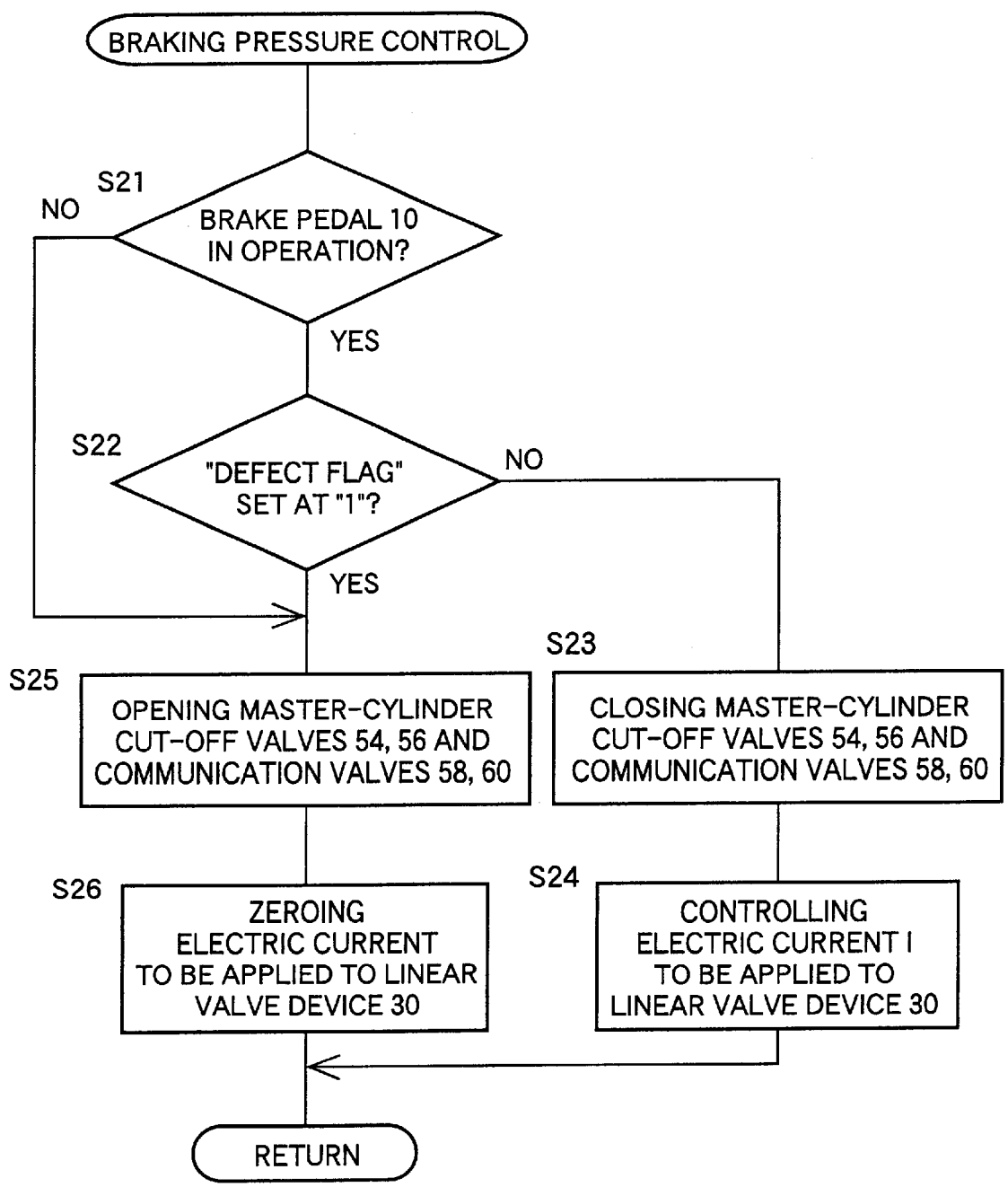
FIG. 7 is a flow chart illustrating a braking pressure control routine executed according to a control program stored in the ROM of the braking pressure control apparatus.

The ROM 146 stores various control programs such as a program for executing an accumulator diagnosing routine illustrated in the flow chart of FIG. 5, a pump motor control routine illustrated in the flow chart of FIG. 6, and a program for executing a braking pressure control routine illustrated in the flow chart of FIG. 7.

There will next be described an operation of the present hydraulically operated braking system constructed as described above.

While the accumulator 74 is normal, the pump motor 72 is controlled so that the fluid pressure in the accumulator chamber 84 as detected by the pressure sensor 92 is held within the predetermined optimum range.

Further, the master-cylinder cut-off valves 54, 56 are placed in the closed state, so that the wheel brake cylinders 20, 28 are isolated from the hydro-booster master cylinder unit 14, and are held in communication with the power-operated hydraulic pressure source 12. In this condition, the front and rear wheel brakes 18, 26 are operated with the pressurized fluid delivered from the hydraulic pressure source 12. In the present embodiment, the wheel brake cylinders 20, 28 are fluid-operated actuators. Described more specifically, the amounts of electric current to be applied to the solenoid coils 108 of each linear valve device 30 are controlled to control the braking pressure in the corresponding wheel brake cylinder 20, 28 (hereinafter referred to as "wheel braking pressure") so that a braking torque corresponding to the wheel braking pressure coincides with a value desired by the vehicle operator. The operator's desired braking torque value is represented by the operating stroke of the brake pedal 10 as detected by the stroke sensor 130, and the fluid pressures as detected by the master-cylinder pressure sensors 132, 134. Described in detail, the operator's desired braking torque is determined on the basis of the brake operating stroke in an initial period of an operation of the brake pedal 10, and on the basis of the fluid pressures detected by the master-cylinder pressure sensors 132, 134 in the other cases. The use of the brake operating stroke to determine the operator's desired braking torque in the initial period of operation of the brake pedal 10 makes it possible to reduce an advance influence of a delayed increase in the fluid pressure in the master cylinder 42. While the accumulator 14 is normal, the communication valves 58, 60 are placed in the closed state while the simulator shut-off valve 64 is placed in the open state.

While the accumulator 74 is defective, the operation of the pump motor 72 is inhibited.

In this case, the master-cylinder cut-off valves 54, 56 and the communication valves 58, 50 are placed in the open state, while the solenoid coils 108 of all linear valve devices 30 are de-energized, so that the brake cylinders 20, 28 are isolated from the power-operated hydraulic pressure source 30 and is communicated with the hydro-booster master cylinder unit 14. The master cylinder 42 pressurizes the fluid according to an operating state of the brake pedal 10, so that the wheel brake cylinders 20, 28 are operated to activate the respective wheel brakes 18, 26. In this condition, the simulator shut-off valve 64 is placed in the closed state, so that the stroke simulator 62 is isolated from the master cylinder 42, to prevent an unnecessary consumption of the pressurized fluid delivered from the master cylinder 42.

In the hydro-booster master cylinder unit 14, the hydraulic booster 40 is normally operated with the pressurized fluid delivered from the hydraulic pressure source 12. When the pressurized fluid is not delivered from the hydraulic pressure source 12 due to a defect thereof, the hydraulic booster 40 is not operable, so that the hydro-booster master cylinder 14 functions merely as the master cylinder 42. That is, the pressurizing piston of the master cylinder 42 is advanced by the operating force applied to the brake pedal 10 by the vehicle operator, and the fluid mass in the pressurizing chamber of the master cylinder 42 is pressurized, so that front the wheel brake cylinders 20 are operated with the pressurized fluid received from the master cylinder 42, to activate the front wheel brakes 18.

In the present embodiment, the accumulator 74 is diagnosed for any abnormality thereof such as sealing failure of the sealing portion 100 and fluid leakage at the connecting portion 88, according to the accumulator diagnosing routine illustrated in the flow chart of FIG. 5. This accumulator diagnosing routine is repeatedly executed with a predetermined cycle time.

While the ignition switch 138 is in the ON state, the pump motor 72 is operated and controlled to hold the fluid pressure in the accumulator chamber 84 within the predetermined optimum range, so that the bellows 82 is not usually contracted to such an extent that causes the sealing member 96 to close the aperture 98 in the stopper 99, that is, the sealing member 96 is not seated on the stopper 99 while the pump motor 72 is in operation. While the ignition switch 138 is in the OFF state, the pump motor 72 is not in operation. If the pump motor 72 is held in the OFF state for a relatively long time, the pressurized fluid leaks from the accumulator chamber 84 at a very low rate, and the bellows 82 is slowly contracted until the sealing member 96 is brought into abutting contact with the stopper 99. On some automotive vehicles, the accumulator chamber 84 is communicated with the master reservoir 78 or any other low-pressure source when the ignition switch 138 is turned OFF, so that the sealing member 96 is seated on the stopper 99. Thus, while the ignition switch 138 is in the OFF state, the accumulator chamber 84 is fluid-tightly sealed by the sealing portion 100 placed in the fluid-tightly closed state, in which the accumulator chamber 84 is isolated from both the pump device 73 and the wheel brake cylinders 20, 28. While the accumulator 74 is normal without any defect at the sealing portion 100 and any other portions, in the OFF state of the ignition switch 138, the fluid pressure in the accumulator 84 will not be reduced below a predetermined threshold. While the accumulator 74 is defective with any defect at the sealing member 96 or connecting portion 88, for instance, the fluid pressure in the accumulator chamber 84 is reduced below the predetermined threshold.

In view of the above finding, the present embodiment is adapted such that when the ignition switch 138 has been switched from its OFF state to its ON state, that is, when there is a possibility of the fluid pressure drop in the accumulator chamber 84 below the predetermined threshold, the fluid pressure in the accumulator chamber 84 detected by the pressure sensor 92 is compared with the predetermined threshold, to diagnose the accumulator 74 to be defective if the detected fluid pressure is lower than the threshold.

The accumulator diagnosing routine of FIG. 5 is initiated with step S1 to determine whether the ignition switch 138 has been turned on, that is, has been switched from the OFF state to the ON state. If an affirmative decision (YES) is obtained in step S1, the control flow goes to step S2 to determine whether the fluid pressure in the accumulator chamber 84 detected by the pressure sensor 92 is lower than the predetermined threshold. If the detected fluid pressure is not lower than the threshold, a negative decision (NO) is obtained in step S2, and the control flow goes to step S3 to determine that the accumulator 74 is normal, and reset a DEFECT flag to "0". If the detected fluid pressure is lower than the threshold, an affirmative decision (YES) is obtained in step S2, and the control flow goes to step S4 to determine that the accumulator 74 is defective, and set the DEFECT flag to "1".

It is noted that although the pump device 73 is started immediately after the ignition switch 138 has been turned on, step S2 is implemented immediately after step S1, an operation of the pump device 73 does not have a significant influence on the fluid pressure in the accumulator chamber 84 as detected by the pressure sensor 92. In other words, the pump device 73 may be considered to be at rest when the comparison in step S2 is implemented.

The predetermined threshold used in step S2 may be suitably determined to be a value below which the accumulator 74 is considered to be defective. For instance, the threshold is determined on the basis of the gas pressure in the gas chamber 86. Described in detail, the fluid pressure in the accumulator chamber 84 is theoretically or normally equal to the gas pressure in the gas chamber 86, so that the accumulator 74 may be considered to be defective if the fluid pressure in the accumulator chamber 84 is lower than the nominal gas pressure by more than a predetermined amount. That is, the threshold may be determined to be lower than the nominal gas pressure by a suitable amount.

Where the accumulator 74 is diagnosed by comparison of the fluid pressure in the accumulator chamber 84 with the gas pressure in the gas chamber 86, a gas pressure sensor for detecting the gas pressure is used. In a second embodiment of this invention shown in FIG. 8, the body of the housing 80 of the accumulator incorporates a gas-chamber pressure sensor in the form of a gas pressure sensor 150 for directly detecting the gas pressure in the gas chamber 86.

The pump motor 72 is controlled according to the pump motor control routine illustrated in the flow chart of FIG. 6.

The pump motor control routine of FIG. 6 is initiated with step S11 to determine whether the DEFECT flag is set at "0". If the flag is set at "0", the control flow goes to step S12 in which the pump motor 72 is controlled in a normal manner. If the flag is set at "1", an affirmative decision (YES) is obtained in step S11, and the control flow goes to step S13 to turn off the pump motor 72. In the normal control of the pump motor 72 in step S12, the pump motor 72 is controlled so that the fluid pressure detected by the pressure sensor 92 is held within the predetermined optimum range, as described above.

The linear valve devices 30, master-cylinder cut-off valves 54, 56 and communication valves 58, 60 are controlled to control the braking pressure in each wheel brake cylinder 20, 28, according to the braking pressure control routine illustrated in the flow chart of FIG. 7

The braking pressure control routine of FIG. 7 is initiated with step S21 to determine whether the brake pedal 10 is in operation. If an affirmative decision (YES) is obtained in step S21, the control flow goes to step S21 to determine whether the DEFECT flag is set at "1".

If the DEFECT flag is set at "0", namely, if a negative decision (NO) is obtained in step S22, it means that the accumulator 74 is normal. In this case, the braking pressure in the wheel brake cylinders 20, 28 is controlled in the normal manner, with the linear valve devices 30 being controlled so as to control the pressurized working fluid delivered from the power-operated hydraulic pressure source 12. Described in detail, steps S23 and S34 are implemented to place the master-cylinder cut-off valves 54, 56 in the closed state, and control the amounts of electric current to be applied to the linear valve devices 30 such that the actual braking torque generated by the brakes 18, 26 based on the braking pressure coincides with an operator's desired value.

If the DEFECT flag is set at "1", namely, if an affirmative decision (YES) is obtained in step S22, it means that the accumulator 74 is defective. In this case, the wheel brake cylinders 20, 28 are supplied with the pressurized fluid delivered from the hydro-booster master cylinder unit 14. That is, steps S25, 26 are implemented to place the master-cylinder cut-off valves 54, 56 in the open state, and zero the amounts of electric current to be applied to the linear valve devices 30.

Figure 8:
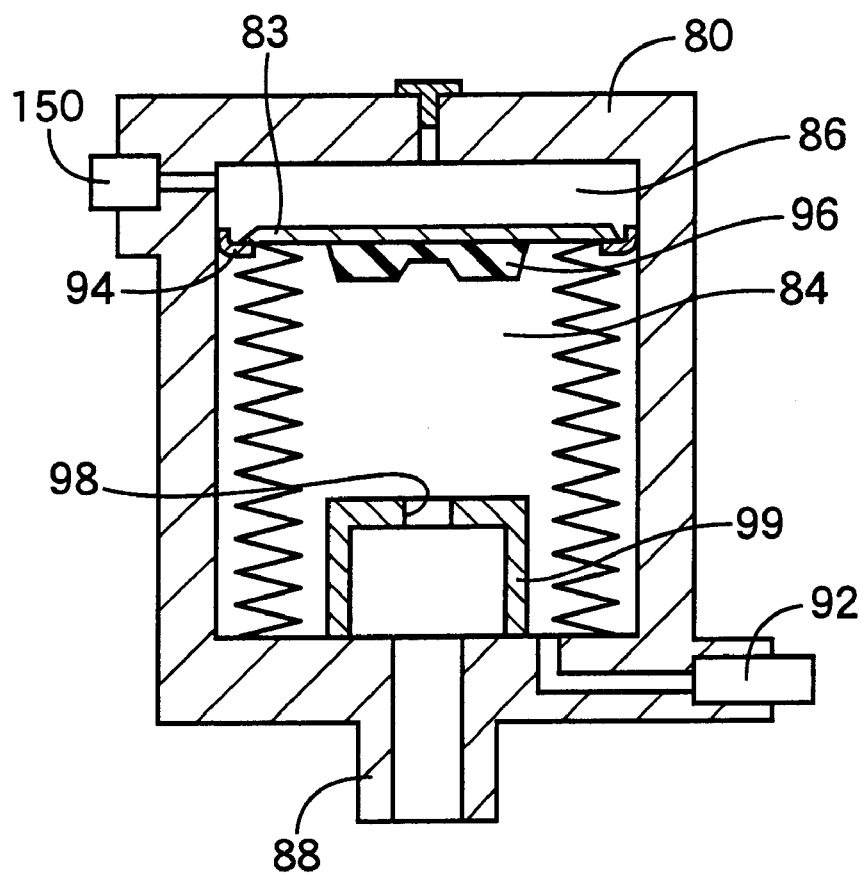
FIG. 8 is an elevational view in cross section schematically showing an accumulator which is constructed according to a second embodiment of this invention and which is to be diagnosed by an accumulator diagnosing apparatus also constructed according to the second embodiment.

Thus, the first and second embodiments of FIGS. 1 and 8 are arranged to diagnose the accumulator 74 when the ignition switch 138 has been switched from the OFF state to the ON state, that is, when the accumulator chamber 84 is placed in the fluid-tightly sealed state with the sealing portion 100 placed in the fluid-tightly closed state, with a drop of the fluid pressure in the accumulator chamber 84. In other words, the accumulator 74 is diagnosed on the basis of the fluid pressure in the accumulator chamber 84 detected immediately after the ignition switch 138 has been turned ON. The present arrangement permits accurate diagnosis of the accumulator 74 such as a sealing failure at the sealing portion 100 and a fluid leakage from the chamber 84.

It is also noted that the pressure sensor 92 for detecting the fluid pressure in the accumulator chamber 84 is supported by the housing 80 of the accumulator 74, and is not connected to a fluid passage outside the housing 80. Accordingly, the power-operated hydraulic pressure source 12 including the accumulator 74 can be relatively easily assembled. Further, the pressure sensor 92 built in the housing 80 permits a comparatively high decree of accuracy of detection of the fluid pressure in the accumulator chamber 84, leading to an improved reliability of diagnosis of the accumulator 74.

In addition, the pressure sensor 92 is used not only for diagnosing the accumulator 74, but also for controlling the pump motor 72 and the pressure-increasing liner valve 102 of each linear valve device 30. Accordingly, the present braking system is available at a lower cost than a braking system which uses two pressure sensors, one for diagnosing the accumulator 64, and other for controlling the pump motor 72 and linear valve devices 30.

Further, the pump device 73 is held in the off state after the accumulator 74 is diagnosed to be defective, so that a stress acting on the bellows 82 is reduced while the accumulator 74 is defective.

The accumulator 74 may be diagnosed at any suitable opportunity, other than the moment at which the ignition switch 138 has been switched from its OFF state to its ON state. For instance, the accumulator 74 may be diagnosed while the ignition switch 138 is in the OFF state. In this case, the diagnosis is effected on the basis of the fluid pressure in the accumulator chamber 84, which is detected a predetermined time after the ignition switch 138 has been switched from the ON state to the OFF state. Alternatively, the accumulator 74 is diagnosed when the wheel brakes 18, 26 are not required to be operated, irrespective of whether the operating state of the ignition switch 138. In this case, the accumulator chamber 84 is brought to its fluid-tightly sealed state with the sealing portion 100 placed in the closed state, for the purpose of diagnosing the accumulator 74 while it is not necessary to operate the wheel brakes 18, 26, for instance, while the vehicle speed detected by the vehicle speed sensor 140 is zero, or while the parking brake is in operation (while the braking brake switch 142 is in the ON state). For instance, the accumulator chamber 84 may be brought to its fluid-tightly sealed state by first turning off the pump 72 and then communicating the accumulator 74 with the brake cylinders 20, 28 or master reservoir 78, to discharge the pressurized fluid from the accumulator chamber 84 to the brake cylinders 20, 28 or master reservoir 78.

The sealing portion 100 may be diagnosed to suffer from a sealing failure or defect, if the fluid pressure in the accumulator chamber 84 a predetermined time after the accumulator chamber 84 is fluid-tightly sealed is lower than a predetermined threshold, or if a rate of reduction of that fluid pressure is lower than a predetermined threshold.

Figure 9A:
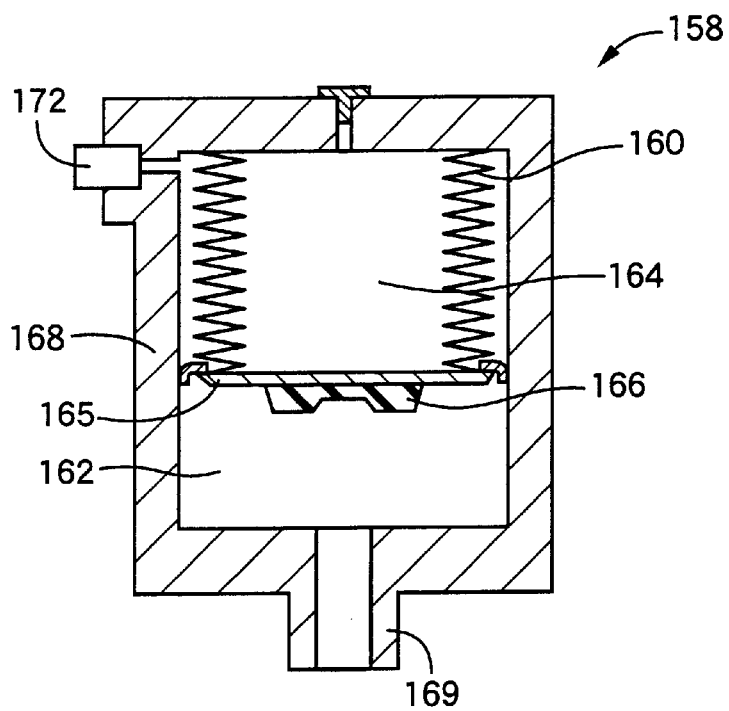
FIGS. 9A and 9B are elevational views in cross section schematically showing an accumulator constructed according to a third embodiment of the invention and which is to be diagnosed by an accumulator diagnosing apparatus also constructed according to the third embodiment.
Figure 9B:
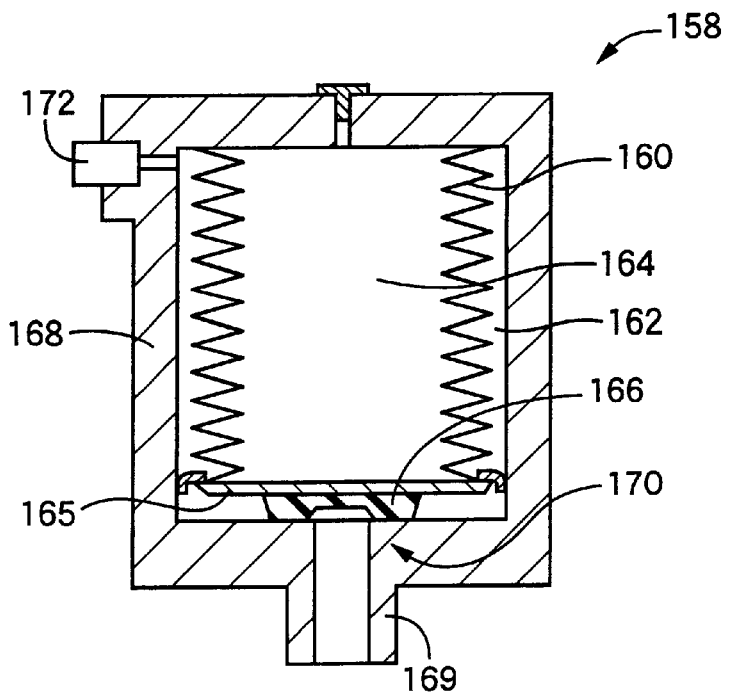

Referring to FIGS. 9A and 9B, there is shown an accumulator 158 constructed according to a third embodiment of this invention. This accumulator 158 has an accumulator chamber 162 formed outside a bellows 160, and a gas chamber 164 formed inside the bellows 160. The bellows 160 has an end plate 165 which carries a sealing member 166 fixed to its outer surface exposed to the accumulator chamber 162. The bellows 160 is elongated as the volume of the accumulator chamber 162 is reduced. When the bellows 160 is fully elongated, the sealing member 160 is seated on the inner surface of the bottom wall of a housing 168 of the accumulator 158. The bottom wall has a connector 169 whose open end is open to the accumulator chamber 162 when the sealing member 166 is spaced from the bottom wall, as indicated in FIG. 9A, and is closed by the sealing member 166 when the sealing member 166 is seated on the bottom wall, as indicated in FIG. 9B. Thus, the accumulator chamber 162 is fluid-tightly sealed by the sealing member 166. In the present third embodiment, the bottom wall of the housing 168 serves as a stopper, and the sealing member 166 and the stopper including the connector 169 cooperate with each other to constitute a sealing portion 170, as indicated in FIG. 9B. The sealing portion 170 may be considered to be a cut-off device for isolating the accumulator chamber 162 from the pump device 73 and the wheel brake cylinders 20, 28. The body of the housing 168 incorporates a pressure sensor 172 for detecting the fluid pressure in the accumulator chamber 162.

The accumulator according to the present invention need not include a sealing portion within the housing. In a fourth embodiment of this invention shown in FIG. 10, the fluid passage 90 connected to the connector 169 of an accumulator 180 is provided with an electromagnetic cut-off valve 184. The accumulator chamber 162 is isolated from the pump device 73 and the wheel brake cylinders 20, 28 when the cut-off valve 184 is placed in the closed state.

Figure 10:
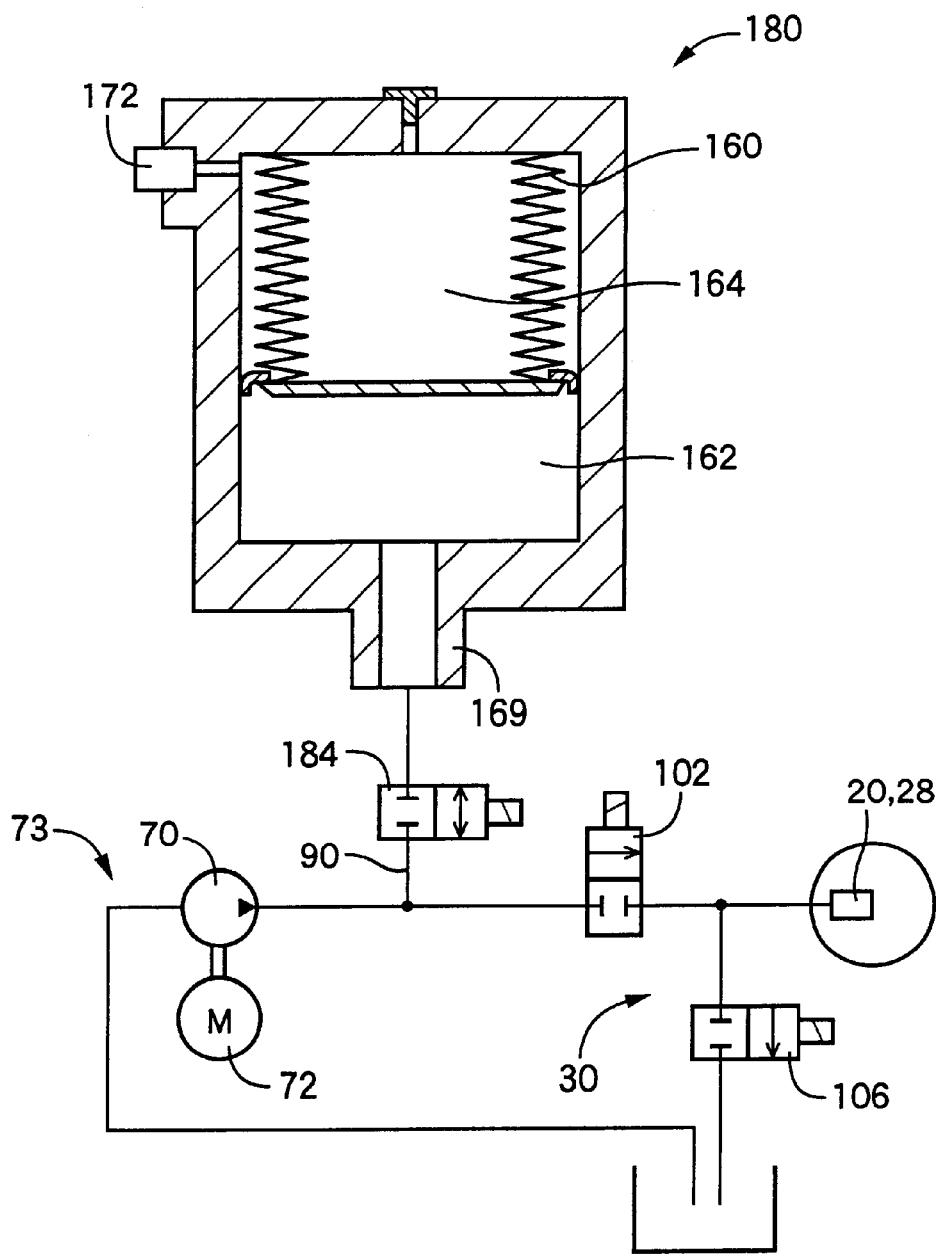
FIG. 10 is an elevational view in cross section schematically showing an accumulator constructed according to a fourth embodiment of the invention and which is to be diagnosed according to an accumulator diagnosing apparatus also constructed according to the fourth embodiment.

According to the fourth embodiment of FIG. 10, the accumulator 180 can be diagnosed while the fluid pressure in the accumulator chamber 162 is relatively high. Described more specifically, the cut-off valve 184 is brought to the closed state and the pump device 73 is turned off when the fluid pressure in the accumulator chamber 162 is held within a predetermined range. The accumulator 180 and the cut-off valve 184 are diagnosed on the basis of a state in which the fluid pressure in the accumulator chamber 162 is subsequently reduced.

In the fourth embodiment, too, the diagnosis is desirably performed while the brake cylinders 20, 28 are not required to be operated.

Figure 11:
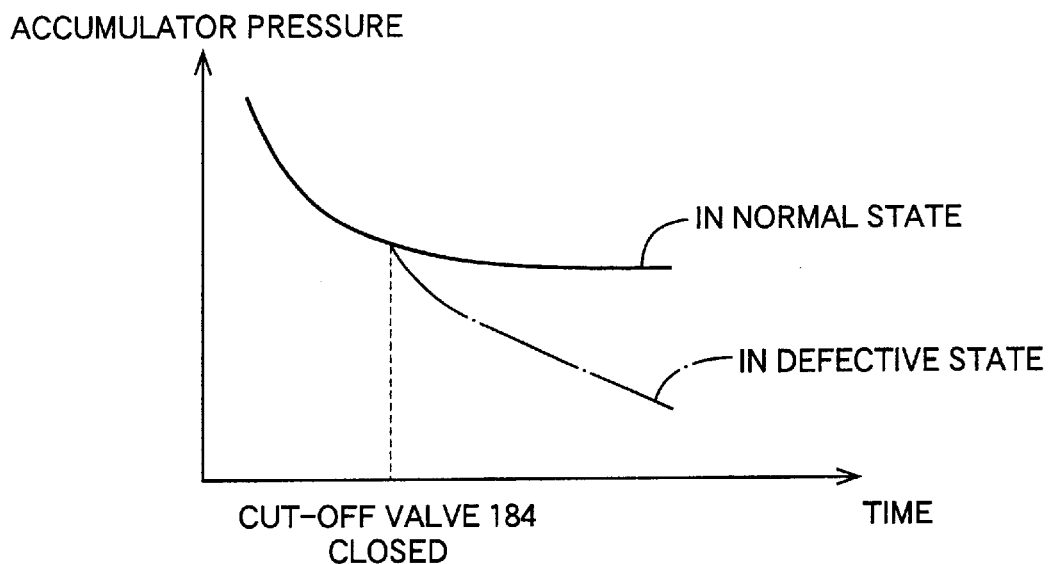
FIG. 11 is a graph indicating a pattern of change in the fluid pressure in the accumulator chamber of the accumulator of FIG. 10.

The fluid pressure in the accumulator chamber 162 is held substantially constant after the cut-off valve 184 is closed, if the cut-off valve 184 is normal, but is reduced if the cut-off valve 184 is defective in its cut-off function. For instance, the cut-off valve 184 is diagnosed to be defective if the fluid pressure in the accumulator chamber 162 a predetermined time after the cut-off valve 184 is closed is lower than a predetermined threshold, or a rate of reduction of that fluid pressure is lower than a predetermined threshold, as indicated in the graph of FIG. 11.

Figure 12:
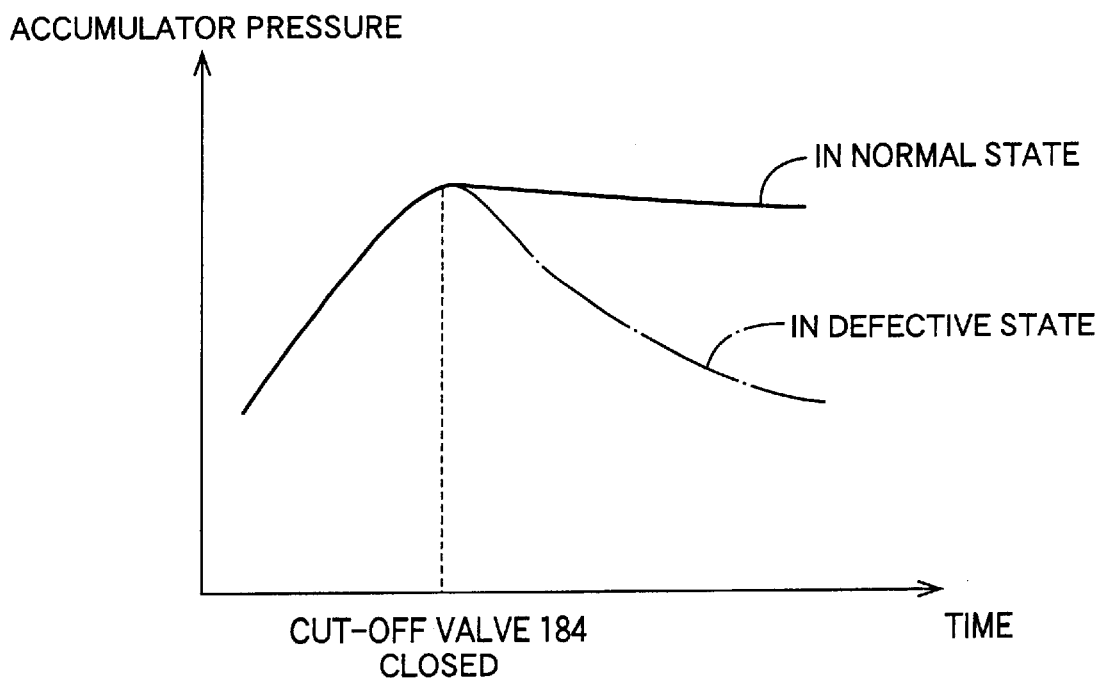
FIG. 12 is a graph indicating another pattern of change in the fluid pressure in the accumulator of FIG. 10.

To diagnose the accumulator 180 and cut-off valve 184, the cut-off valve 184 may be closed after the fluid pressure in the accumulator chamber 162 is increased to a predetermined value, as indicated in the graph of FIG. 12.

The predetermined value of the fluid pressure at which the cut-off valve 184 is closed to effect the diagnosis is preferably high enough to permit evaluation of the state in which the fluid pressure in the chamber 162 is reduced after the cut-off valve 184 is closed. However, the cut-off valve 184 need not be closed at a predetermined value of the fluid pressure in the accumulator chamber 162. In other words, the cut-off valve 184 may be closed when the diagnosis is effected. In this case, the diagnosis is effected on the basis of the state in which the fluid pressure in the chamber 162 is reduced after the cut-off valve 184 is closed.

In the embodiment of FIG. 10, a pressure sensor may be disposed in a portion of the fluid passage 90 between the cut-off valve 184 and the accumulator chamber 162.

The accumulator may be provided with both a sealing portion within its housing and a cut-off valve outside the housing. This arrangement is effective to reduce the fluid leakage from the accumulator chamber while the ignition switch 138 is in the OFF state, and permits an increase in the energy efficiency of the power-operated hydraulic pressure source 12.

Figure 13:
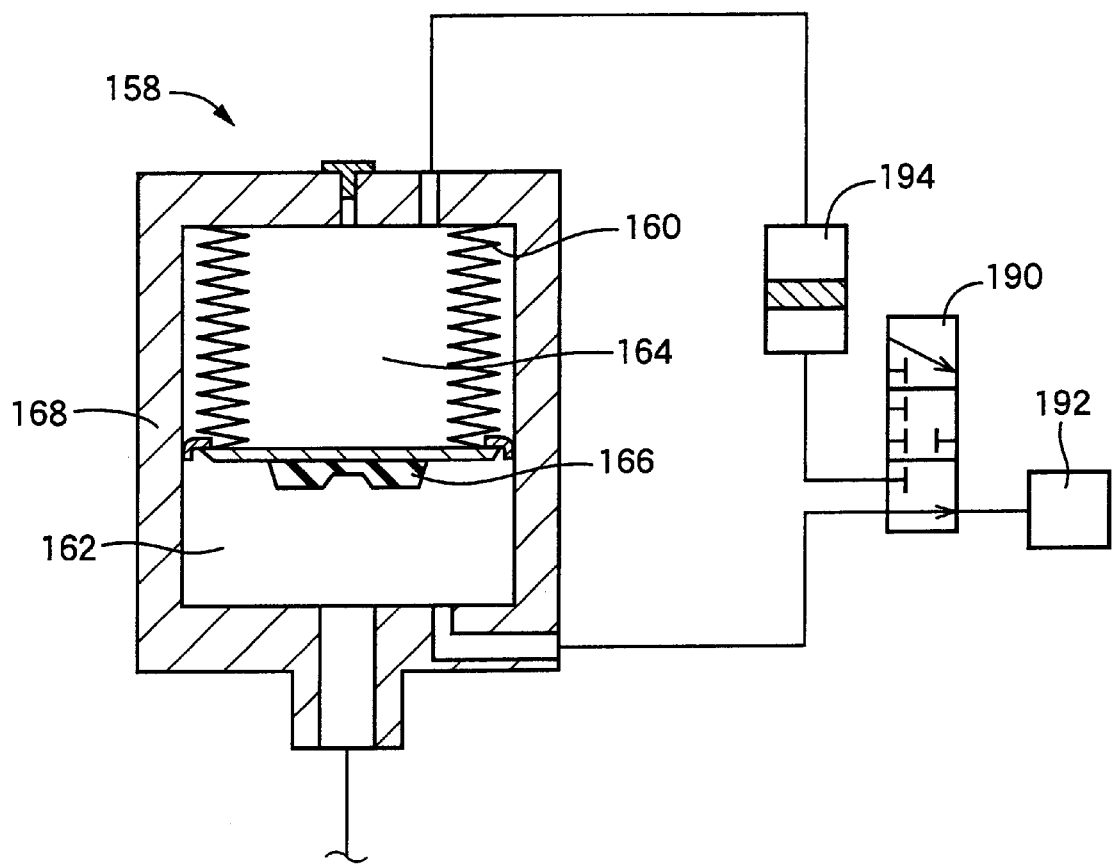
FIG. 13 is an elevational view in cross section schematically showing an accumulator constructed according to a fifth embodiment of this invention and which is to be diagnosed by an accumulator diagnosing apparatus also constructed according to the fifth embodiment.

The accumulator 158 of FIGS. 9A and 9B may be diagnosed on the basis of the fluid pressure in the accumulator chamber 162 and the gas pressure in the gas chamber 164. For instance, a switch valve 190 is disposed between the accumulator chamber 162 and the gas chamber 164, according to a fifth embodiment of this invention, as indicated in FIG. 13. In this case, the pressure sensor 192 is selectively communicated with the accumulator chamber 162 or gas chamber 164 through the switch valve 190. Described in detail, the switch valve 190 has a first state for fluid communication of the pressure sensor 192 with the accumulator chamber 162, a second state for fluid communication of the pressure sensor 192 with the gas chamber 164, and a third state for isolating the pressure sensor 192 from both the accumulator chamber 162 and the gas chamber 164. In the first state of the switch valve 190, the fluid pressure in the accumulator chamber 162 is detected. In the second state of the switch valve 190, the gas pressure in the gas chamber 164 is detected. The provision of the third state of the switch valve 190 permits accurate detection of the fluid and gas pressures in the chambers 162, 164. It is preferable to provide a separating device 194 between the gas chamber 164 and the switch valve 190. The separating device 194 prevents mixing of the gas in the gas chamber 164 with the incompressible fluid (liquid) in the accumulator chamber 162.

In the embodiments described above, the pump motor 72 is turned off when the accumulator is diagnosed to be defective. However, the pump motor 72 may be kept operated even after the accumulator is diagnosed to be defective. In this case, the pump motor 72 is operated such that the upper limit of the fluid pressure in the accumulator chamber is lower than in the normal state of the accumulator, so as to reduce the amount of deformation of the bellows and to thereby reduce the load acting on the bellows.

The diagnosing apparatus according to the present invention is equally applicable to an accumulator of bladder type or piston type, rather than an accumulator of bellow type. The diagnosing apparatus is also applicable to an accumulator for storing a pressurized gas (compressible fluid).

It is to be understood that the present invention may be embodied with various other changes, modifications and improvements, such as those described in the SUMMARY OF THE INVENTION, which may occur to those skilled in the art, without departing from the spirit and scope of the invention defined in the following claims.

What is claimed is:

1. A diagnosing apparatus for diagnosing an accumulator having an accumulator chamber, the accumulator being operable to store under pressure a pressurized fluid delivered from a high-pressure source and supply said pressurized fluid to a fluid-operated actuator for operating said fluid-operated actuator with said pressurized fluid, said apparatus comprising:

a pressure detecting device operable to detect a pressure of the pressurized fluid in said accumulator while said accumulator is placed in a fluid-tightly sealed state in which said accumulator chamber is sealed from both said high-pressure source and said fluid-operated actuator; and a diagnosing device operable to diagnose said accumulator on the basis of the pressure of the pressurized fluid detected by said pressure detecting device in said fluid-tightly sealed state of said accumulator.

2. A diagnosing apparatus according to claim 1, wherein said accumulator includes:
   a housing; and
   a partition member disposed in said housing and cooperating with said housing to define said accumulator chamber on one of opposite sides of said partition member, said accumulator chamber storing the pressurized fluid delivered from said high-pressure source,
   said pressure detecting device including an accumulator-chamber pressure sensor operable to detect the pressure of the pressurized fluid in said accumulator chamber.

3. A diagnosing apparatus according to claim 2, wherein said accumulator includes a cut-off device having a first state in which said accumulator chamber is communicated with at least one of said high-pressure source and said fluid-operated actuator, and a second state in which said accumulator chamber is isolated from both said high-pressure source and said fluid-operated actuator.

4. A diagnosing apparatus according to claim 1, wherein said accumulator includes:
   a housing;
   a partition member disposed in said housing and cooperating with said housing to define said accumulator chamber and a gas chamber on respective opposite sides of said partition member, said accumulator chamber storing the pressurized fluid delivered from said high-pressure source, while said gas chamber being fluid-tightly charged with a pressurized gas having a pressure which is substantially equal to the pressure of said pressurized fluid in said accumulator chamber; and
   a stopper operable to limit an amount of reduction of a volume of said accumulator chamber.

5. A diagnosing apparatus according to claim 4, wherein said pressure detecting device includes:
   an accumulator-chamber pressure sensor operable to detect the pressure of the pressurized fluid in said accumulator chamber; and
   a gas-chamber pressure sensor operable to detect the pressure of the pressurized gas in said gas chamber,
   and wherein said diagnosing device is operable to diagnose said accumulator on the basis of the pressure of the pressurized fluid detected by said accumulator-chamber pressure sensor and the pressure of the pressurized gas detected by said gas-chamber pressure sensor.

6. A diagnosing apparatus according to claim 1, wherein said accumulator includes:
   a housing; and
   a partition member disposed in said housing and cooperating with said housing to define said accumulator chamber and a gas chamber on respective opposite sides of said partition member, said accumulator chamber storing the pressurized fluid delivered from said high-pressure source, while said gas chamber being fluid-tightly charged with a pressurized gas having a pressure which is substantially equal to the pressure of said pressurized fluid in said accumulator chamber.

7. A diagnosing apparatus according to claim 6, wherein said pressure detecting device includes:
   an accumulator-chamber pressure sensor operable to detect the pressure of the pressurized fluid in said accumulator chamber; and
   a gas-chamber pressure sensor operable to detect the pressure of the pressurized gas in said gas chamber,
   and wherein said diagnosing device is operable to diagnose said accumulator on the basis of at least one of the pressure of the pressurized fluid detected by said accumulator-chamber pressure sensor and the pressure of the pressurized gas detected by said gas-chamber pressure sensor.

8. A diagnosing apparatus according to claim 1, wherein said accumulator includes:
   a housing;
   a partition member disposed in said housing and cooperating with said housing to define said accumulator chamber on one of opposite sides of said partition member, said accumulator chamber storing the pressurized fluid delivered from said high-pressure source; and
   a sealing portion operable to fluid-tightly seal said accumulator chamber when a volume of said accumulator chamber has decreased to a predetermined value.

9. A diagnosing apparatus according to claim 8, wherein said pressure detecting device includes an accumulator-chamber pressure sensor operable to detect the pressure of the pressurized fluid in said accumulator chamber,
   and wherein said diagnosing device is operable to diagnose said accumulator on the basis of the pressure of the pressurized fluid detected by said accumulator-chamber pressure sensor when said accumulator chamber is fluid-tightly sealed by said sealing portion.

10. A diagnosing apparatus according to claim 1, wherein said accumulator has an accumulator chamber for storing the pressurized fluid delivered from said high-pressure source, and includes an electromagnetic cut-off valve device having a fist state in which said accumulator chamber is communicated with at least one of said high-pressure source and said fluid-operated actuator, and a second state in which said accumulator chamber is isolated from both of said high-pressure source and said fluid-operated actuator,
   and wherein said pressure detecting device includes an accumulator-chamber pressure sensor operable to detect the pressure of the pressurized fluid in said accumulator chamber,
   said diagnosing device being operable to diagnose said accumulator on the basis of the pressure of the pressurized fluid in said accumulator chamber detected when said electromagnetic cut-off valve device is placed in said second state.

11. A diagnosing apparatus according to claim 10, wherein said diagnosing device includes a switching portion operable to switch said electromagnetic cut-off valve device from said first state to said second state when the pressure of the pressurized fluid in said accumulator chamber detected by said accumulator-chamber pressure sensor has a predetermined value, said diagnosing device being operable to diagnose said accumulator on the basis of a change in the pressure of the pressurized fluid in said accumulator chamber detected by said accumulator-chamber pressure sensor after said cut-off valve device is switched to said second state.

12. A diagnosing apparatus according to claim 1, wherein said diagnosing device is operable to diagnose said accumulator in at least one of a first condition in which said high-pressure source is not placed in a substantially operated state and a second condition in which a supply of the pressurized fluid from said accumulator to said fluid-operated actuator is not necessary.

13. A diagnosing apparatus according to claim 1, wherein said high-pressure source comprises a pump device including (a) an electric motor, and (b) a pump driven by said electric motor, to deliver a pressurized fluid, said high-pressure source being included in a braking system for an automotive vehicle.

14. A diagnosing apparatus according to claim 1, wherein said fluid-operated actuator includes a wheel brake cylinder of a wheel brake for braking a wheel of a vehicle, said wheel brake including a rotor rotating with said wheel and a friction member which is forced onto said rotor by said wheel brake cylinder to brake said wheel.

15. A diagnosing apparatus according to claim 1, wherein an output of said pressure detecting device is used to control said high-pressure source.

16. A diagnosing apparatus according to claim 1, wherein an output of said pressure detecting device is used to control a pressure control device disposed between said fluid-operated actuator and said accumulator.

17. An apparatus including the diagnosing apparatus according to claim 1 and operable to control said high-pressure source in different manners when the diagnosing apparatus determines that said accumulator are normal and defective, respectively.

18. A combination of an accumulator and a diagnosing apparatus for diagnosing said accumulator, said accumulator comprising:

a housing;

a bellows disposed in said housing and cooperating with said housing to define an accumulator chamber and a gas chamber on respective opposite sides of said bellows, said accumulator chamber storing a pressurized fluid while said gas chamber being fluid-tightly charged with a pressurized gas having a pressure which is substantially equal to a pressure of said pressurized fluid in said accumulator chamber;

an accumulator-chamber pressure sensor operable to detect the pressure of the pressurized fluid in said accumulator chamber; and a sealing device operable to fluid-tightly seal said accumulator chamber when a volume of said accumulator chamber has decreased to a predetermined value, said diagnosing apparatus comprising a diagnosing device operable to diagnose said accumulator on the basis of the pressure of the pressurized fluid detected by said accumulator-chamber pressure sensor when said accumulator chamber is fluid-tightly sealed by said sealing device.

19. An accumulator comprising:

a housing having an opening;

a bellows disposed in said housing and cooperating with said housing to define an accumulator chamber and a gas chamber on respective opposite sides of said bellows, said accumulator chamber storing a pressurized fluid which is introduced therein and delivered therefrom through said opening, while said gas chamber being fluid-tightly charged with a pressurized gas having a pressure which is substantially equal to a pressure of said pressurized fluid in said accumulator chamber; and an accumulator-chamber pressure sensor attached to said housing so as to detect the pressure of the pressurized fluid within said accumulator chamber when said accumulator chamber is fluid-tightly sealed from said opening.

20. An accumulator according to claim 19, further comprising a sealing device operable to fluid-tightly seal said accumulator chamber from said inlet when a volume of said accumulator chamber has decreased to a predetermined value.

* * * * *